US010721260B1

(12) United States Patent
Schlarp et al.

(10) Patent No.: US 10,721,260 B1
(45) Date of Patent: Jul. 21, 2020

(54) DISTRIBUTED EXECUTION OF A NETWORK VULNERABILITY SCAN

(71) Applicant: Amazon Technologies, Inc., Seattle, WA (US)

(72) Inventors: Charles Schlarp, Seattle, WA (US); Joshua Williams, Lynnwood, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 383 days.

(21) Appl. No.: 15/466,772

(22) Filed: Mar. 22, 2017

(51) Int. Cl.
*H04L 29/06* (2006.01)

(52) U.S. Cl.
CPC .................. *H04L 63/1433* (2013.01)

(58) Field of Classification Search
CPC .................................................. H04L 63/1433
USPC .......................................................... 726/25
See application file for complete search history.

(56) References Cited

U.S. PATENT DOCUMENTS

| | | | | |
|---|---|---|---|---|
| 6,456,605 B1 * | 9/2002 | Laakso | ................. | H04W 52/24 370/330 |
| 6,505,228 B1 * | 1/2003 | Schoening | ............ | G06F 9/4887 709/223 |
| 7,013,395 B1 * | 3/2006 | Swiler | ................. | H04L 63/1433 713/151 |
| 8,151,227 B2 * | 4/2012 | Teig | .................... | G06F 17/5045 716/101 |
| 8,489,765 B2 * | 7/2013 | Vasseur | ................... | H04L 45/48 709/238 |
| 10,033,766 B2 * | 7/2018 | Gupta | ..................... | H04L 63/20 |
| 2005/0138413 A1 * | 6/2005 | Lippmann | ............. | G06F 21/577 726/4 |
| 2005/0192783 A1 * | 9/2005 | Lystad | ............. | G06Q 10/06312 703/3 |
| 2009/0106710 A1 * | 4/2009 | Teig | .................... | G06F 17/5045 716/132 |
| 2012/0233699 A1 * | 9/2012 | Jajodia | .................. | G06F 21/577 726/25 |
| 2013/0067583 A1 * | 3/2013 | Naldurg | ................ | G06F 21/577 726/25 |
| 2015/0281339 A1 * | 10/2015 | Strassner | ............ | H04L 41/0893 709/224 |
| 2015/0381649 A1 * | 12/2015 | Schultz | ............... | H04L 63/1433 726/25 |
| 2016/0063282 A1 * | 3/2016 | Shani | ........................ | G06F 8/60 717/121 |
| 2016/0359872 A1 * | 12/2016 | Yadav | ..................... | H04L 43/04 |
| 2016/0359915 A1 * | 12/2016 | Gupta | ..................... | H04L 43/04 |
| 2017/0046519 A1 * | 2/2017 | Cam | ..................... | G06F 21/577 |

* cited by examiner

*Primary Examiner* — Lynn D Feild
*Assistant Examiner* — Abdullah Almamun
(74) *Attorney, Agent, or Firm* — Quarles & Brady LLP

(57) ABSTRACT

Systems for performing a network scan of one or more targets are provided. The systems select, from functions related to performing a network scan of a target, a first group of functions that are ready to execute at a first time. The first group of functions may be executed by a distributed computing system in parallel to generate first and second results. A third function may then be identified as ready to execute based on the first result, and a fourth function may be excluded from the network scan based on the second result.

20 Claims, 10 Drawing Sheets

DISTRIBUTED EXECUTION OF A NETWORK VULNERABILITY SCAN

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, called "containers." The virtual machine controls allocation of resources such as processing power and memory, and each container has its own process and network space in which the container may, for example, execute software programs.

In such a system, a service provider may operate networks of systems to provide access to software using varying numbers of virtual machine resources. However, performing a network vulnerability scan or another network scan in such a service provider environment may be difficult, as network scans typically execute sequentially and may require substantial amounts of compute resources, which may degrade performance of the service. Additionally, in cases in which customers of the service provider change how they use the compute resources over time, the compute resources may go offline when not in use, and a different customer virtual machine may operate or service may be provided using the same network address as the service that was being scanned. This may make the results of the network scan unreliable, as the results of certain portions of the scan may be relevant to another organization (e.g., the service provider or a customer) entirely.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
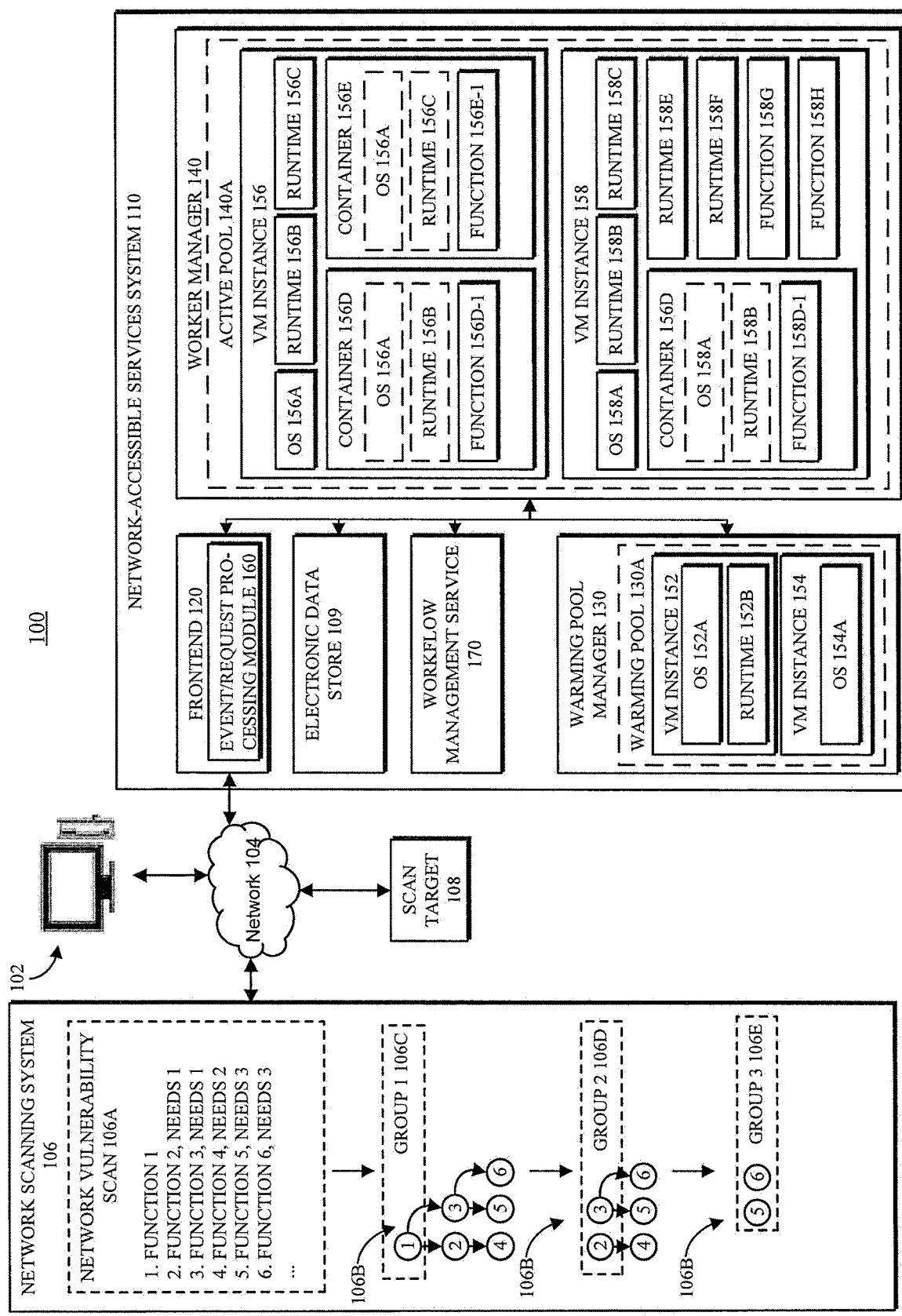
FIG. 1 is a diagram illustrating an exemplary system for executing an exemplary network vulnerability scan in a distributed computing environment, in accordance with the present disclosure.

In general, a network scan may involve sending requests and/or other information to one or more targets, which may include any device or devices that are part of a computer network, such as one or more servers, one or more virtual machines collectively being executed by one or more servers, one or more devices and/or virtual machines associated with a software as a service, one or more devices associated with a web page, one or more endpoints within a network, any other suitable network device, and any suitable combination thereof, and recording how the one or more targets respond. For example, a network vulnerability scan may include a port scan to determine which ports the target(s) have open, determining whether the target allows unauthorized access to information, determining whether the target may be controlled by an unauthorized user, etc. The security of the target may be evaluated based on how the target(s) respond during the network vulnerability scan. Performing a robust network scan on a target computing device, such as a server, may reduce the target computing device's capabilities. For example, a server that is the target of a network scan may not be capable of responding to a client as quickly as normal, or may not be capable of providing content as quickly as possible. In such an example, a network scan may be performed during a period when the server is normally not in use for other purposes, or during a period when the server is taken out of service.

This problem may become more acute when the target of the scan is a service being provided using a distributed computing environment (e.g., a "cloud" computing environment). In such a computing environment, the physical computing device that provides the service may change over time (including, e.g., a network address associated with the physical computing device). Additionally, in some cases, the service provider may meter use of computing resources, so any impact caused by a network scan may be costly monetarily, as well as requiring an extended period of downtime. Further exacerbating these problems, a network scan often uses information, such as the network address of the target of the scan, to identify the target of the scan, but the service being provided at a particular network address may change in a distributed computing environment. For example, depending on demand for different services, the distributed computing environment may use a particular physical device to provide a first service at a first point in time, and a second service a later time. However, a computing device executing a typical network vulnerability scan may not be configured to (or be capable of) determining whether a network address being scanned is still associated with the target of the scan as the scan progresses, and may be incapable of pausing if such an event were to occur. Thus, methods that allow for a distributed execution of a network scan in discrete stages are desirable.

In some embodiments, a network scan may be structured as a collection of functions that each have relatively few lines of code, use relatively few computing resources, and/or may be executed relatively quickly. Each of these functions may correspond to one or more discrete tests (and/or one or more portions of one or more tests) that collectively may be used to determine network vulnerabilities of the target of the network scan. In some embodiments, one or more of the functions may cause information to be sent to the target of the scan to generate a result, while another function(s) may generate a result based on previous results without causing any information to be sent to the target of the network scan. For example, in some embodiments, a function may cause a payload to be sent to the scan target over a network. In such an example, the payload may include any suitable information that may change the behavior of the scan target 108 and/or cause the scan target to respond with particular information.

In some embodiments, one or more of the functions may require a particular type of information in order to properly generate a result. For example, a function that performs a Secure Shell ("SSH") fingerprint scan may require that the target of the scan has responded properly to a synchronization ("SYN") message. As another example, a function that performs a Hypertext Transfer Protocol Secure ("HTTPS") fingerprint scan of the target may require information from the result of a Transport Layer Security ("TLS") fingerprint scan.

In some embodiments, one or more computing devices may act as a network scanning system to coordinate the network scan, for example, by determining an order in which the functions are to be executed; tracking the execution status of functions; and causing the next function(s) to execute. Additionally, in some embodiments, the network scanning system may determine which function or functions are ready to execute at a particular time, and which function or functions require more information before being ready to execute. For example, the network scanning system may analyze each function or access metadata associated with the function to determine if that function requires additional information. In such an example, in a case in which a function requires further information, the network scanning system may determine which other function or functions are configured to generate information that may satisfy the requirement. In some embodiments, if the network scanning system determines that a first function requires information, and that a second function is configured to generate the required information, the network scanning system may create a dependency relationship between the two functions that indicates that the second function may generate information required by the first function. Additionally, in some embodiments, certain functions may be capable of executing without particular information, but that information may be useful in executing the function (e.g., it may generate more complete results, it may generate results more quickly, etc.). In some such embodiments, the network scanning system may create a dependency relationship between two functions that indicates that the second function may generate information that may be used by the first function during execution.

In some embodiments, the network scanning system may generate and/or use a directed acyclic graph ("DAG") in which the nodes are functions that are part of the network scan, and the edges between the nodes represent relationships between the corresponding functions. The edges may be "directed" to indicate a dependent relationship: an edge extending "from" a first node "to" a second node reflects that the function at the second node is dependent on the execution of the function at the first node. Further, an edge extending "from" a first node may be referred to herein as an outgoing edge of the first node, whereas an edge extended "to" a second node may be referred to herein as an incoming edge of the second node. This DAG may be used (e.g., by the network scanning system) to determine which functions are ready to execute, which functions require more information, and/or which functions are superfluous. For example, the network scanning system may determine that a function corresponding to a node in the DAG with no edges directed toward that node is ready to execute. As another example, the network scanning system may determine that a function corresponding to a node in the DAG that has at least one edge directed toward it is not ready to execute. As yet another example, the network scanning system may determine that a function corresponding to a downstream node in the DAG that depends from an upstream node is superfluous if the function corresponding to the upstream node generated information that does not satisfy the requirement of the downstream node. In a more particular example, if the downstream node requires that the target be associated with an SSH server, and the function corresponding to the upstream node indicates that the target is not associated with an SSH server, the network scanning system may determine that the downstream node is superfluous and may be skipped. In some embodiments, the network scanning system may begin topologically sorting the DAG to facilitate the selection of nodes that have no edges directed toward them. For example, the network scanning system may start a topological sorting algorithm that first identifies all nodes which have no incoming edges. In such an example, the network scanning system may stop the topological sorting algorithm. Alternatively, the network scanning system may continue the topological sorting algorithm of the DAG to generate a topological order in which to execute the functions.

In some embodiments, the results of functions that are executed and/or a status related to execution of the function (e.g., whether it completed execution or failed to complete execution) may be stored in an electronic data store. In some such embodiments, the network scanning system may use the stored information to determine if required information for a particular function has been generated (e.g., by an earlier function), if an earlier function that may generate the required information completed without generating the required information, whether the earlier function has not yet been executed, etc. In some embodiments, some of the information stored in the electronic data store may be used as an input to a later function. For example, a function that determines the version of software executing on an HTTPS server associated with the target may use a result from a function that executed an HTTPS fingerprinting process that is stored in the electronic data store.

In some embodiments, the network scanning system may pause execution of the network scan. For example, prior to causing one or more functions that are ready to execute to be executed, the network scanning system may determine whether the target of the network scan is unavailable by, for example, determining whether a network address associated with the target of the network scan is still associated with the target of the network scan (e.g., rather than another service), whether the load on the target is at or above a threshold, etc. If the target of the network scan is unavailable, the network scanning system may wait until the target of the network scan is determined to be available before causing any more functions to be executed.

In some embodiments, the network scanning system may remove nodes (and edges emanating from those nodes) corresponding to functions that have been executed to completion from the DAG. Additionally, in some embodiments, the network scanning system 106 may remove nodes from the DAG that are not executable because the result of a completed function does not satisfy the requirements of those nodes. In some embodiments, after removing nodes from the DAG (e.g., when the associated function are executed or deemed to be superfluous), the network scanning system may topologically re-sort the DAG to identify another function or group of functions that are now ready to execute. Re-sorting the DAG may, in some embodiments, identify nodes that previously had edges directed thereto, but the edges have been removed, indicating that the condition(s) for executing the corresponding functions have been satisfied; these nodes may be moved to the top of the DAG. By iteratively re-sorting the DAG, the network scanning system may continue to cause functions that are ready to execute to be executed by the distributed computing environment until there are no longer any functions that are ready to execute.

In some embodiments, the distributed computing environment may receive instructions from the network scanning system to execute a group of functions. In such an embodiments, the distributed computing environment may execute the functions substantially concurrently (i.e., in parallel) as the functions are ready to execute, potentially using information that is stored in the electronic data store, but the functions do not require any other functions to execute before being executed.

Referring to FIG. 1, embodiments of the present disclosure may operate within or upon a computing environment 100 in which users (e.g., developers, website visitors, etc.) of user computing devices 102 may run various program codes using the virtual computing resources provided by a network-accessible services system 110 allocated within the computing environment 100. Additionally, a network scanning system 106 may determine groups of functions to be run substantially concurrently by the network-accessible services system 110 as part of a network vulnerability scan of one or more scan targets 108. For example, the network scanning system 106 may receive network vulnerability scan information 106A about functions to be used in performing the network vulnerability scan. The network vulnerability scan information 106A may include computer-executable instructions for performing the functions and/or may identify the functions to be performed. In some embodiments, the network vulnerability scan information 106A may include any suitable number of functions that may be used to perform at least a portion of a network vulnerability scan. The network scanning system 106 may generate, such as with the process described below in connection with FIG. 3, a DAG 106B representing the interrelationships of the functions in the network vulnerability scan information 106A, which the network scanning system 106 may use to determine which functions are ready to execute. As described herein, in a DAG 106B of a network vulnerability scan comprising tests or tasks that are each defined by a computer-executable function, each node is associated with one of the functions, and each directed edge from a first node to a second node represents a dependent relationship—a condition that may or must be satisfied before the function at the second node may execute, wherein the execution of the function at the first node causes the condition to be either satisfied or failed. Thus, the exemplary DAG 106B of FIG. 1 represents an execution structure of the network vulnerability scan information 106A as follows: a first function at node 1 requires no conditions to be satisfied, and is ready to execute; a second function at node 2 and a third function at node 3 each require the execution of the first function to satisfy a condition; a fourth function at node 4 requires the execution of the second function to satisfy a condition; and, a fifth function at node 5 and a sixth function at node 6 each require the execution of the third function to satisfy a condition.

In some embodiments, the network scanning system 106 may provide the computer-executable instructions for executing one or more of the functions in the vulnerability scan information 106A to the network-accessible services system 110. For example, at least a portion of the computer-executable instruction may be provided to the network-accessible services system 110 before any requests are made for executing any functions (e.g., during a set-up of the network scanning system 106). As another example, at least a portion of the computer-executable instruction may be provided to the network-accessible services system 110 with a request to execute one or more functions. In a more particular example, the computer-executable instructions for performing the functions for which execution is being may be included with the request. As another more particular example, the computer-executable instructions for performing functions that depend from the functions for which execution is being requested may be included with the request. As yet another example, the computer-executable instructions for performing a group of functions for which execution may be requested soon (e.g., within the next two requests, within the next three requests, etc.) may be provided to the network-accessible services system 110 prior to requests for executing those functions are sent.

In some embodiments, the network scanning system 106 may request that particular functions be executed by the network-accessible services system 110 without ever providing the computer-executable instructions for executing those functions to the network-accessible services system 110 directly (regardless of whether the computer-executable instructions are included in the vulnerability scan information 106A). For example, the network accessible services system 110 may be instructed to download or otherwise access the computer-executable instructions from a source other than the network scanning system 106 by the network scanning system 106 or any other computing device (e.g., a computing device associated with a developer or administrator of the network vulnerability scan specified by the vulnerability scan information 106A). In such embodiments, the network scanning system 106 may send identifying information of the functions to be executed with the request to execute the functions. The identifying information may be in any suitable format that may be used by the network accessible services system 110 to determine which function or functions are to be executed. For example, the identifying information may include names of functions to be executed, alphanumeric identifiers of functions to be executed, locations at which the functions may be found (e.g., a network address, a line number where the function begins, a location in memory where the function is stored, etc.).

In some embodiments, the network scanning system 106 may use the DAG 106B to identify groups of nodes that are ready to execute. For example, the network scanning system 106 may identify a first group 106C of nodes (e.g., including node 1) corresponding to functions that are ready to execute at a first time. The network scanning system 106 may cause the network-accessible services system 110 to execute the first group 106C of functions. After the first group 106C of functions have been executed by the network-accessible services system 110, the network scanning system 106 may remove the nodes in the first group 106C of functions, and identify a second group 106D of functions (e.g., node 2 and node 3) that are ready to execute, and may cause the network-accessible services system 110 to execute the second group 106D of functions. In some embodiments, the network scanning system 106 may determine that the functions have been executed based on any suitable information. For example, the network scanning system 106 may receive a result for each of the functions from the first group from the network-accessible services system 110 (e.g., in a single communication received for all of the functions that executed, or in more than one communication that may be pertinent to one or more individual functions), which may indicate that the functions have all been executed. As another example, the network scanning system 106 may receive information from the network-accessible services system 110 indicating that the functions in the first group of function have all been executed (e.g., in a single communication received for all of the functions that executed, or in more than one communication that may be pertinent to one or more individual functions). In such an example, the network scanning system 106 may access the results (e.g., directly from electronic data store 109 described below, to which network scanning system 106 may have access) or otherwise obtain the results (e.g., by requesting the results from the network-accessible services system 110) to use, for example, in evaluating whether other functions (e.g., functions associated with node 2 and node 3) are ready to execute. As yet another example, the network scanning system 106 may check to determine whether results of the execution of one or more functions are available (e.g., in a database associated with the network vulnerability scan, on a web page associated with the network vulnerability scan).

After the second group 106D of functions have been executed, the network scanning system 106 may remove the nodes in the second group 106D of functions, and any nodes depending from the nodes in the second group 106D of functions for which execution of the node in the second group 106D of functions produced a result that did not satisfy a required condition of the dependent node (e.g., node 4). The network scanning system 106 may then identify a third group 106E of functions (e.g., node 5 and node 6) that are ready to execute. In some embodiments, the network scanning system 106 may continue to remove nodes corresponding to functions that have been executed from the DAG 106B, and remove nodes corresponding to functions that cannot be executed (e.g., node 4 after execution of node 3) from the DAG 106B until no nodes remain that are not ready to execute. Note that although DAG 106B is shown to have only six nodes, this is merely an example and a DAG corresponding to a network vulnerability scan as described herein may include any suitable number of nodes, including hundreds of nodes, thousands of nodes, etc. In some embodiments, the network scanning system 106 may topologically sort the DAG after removing nodes from the DAG to facilitate selecting a next group of functions that are ready to execute. In some embodiments, any suitable technique or combination of techniques may be used to topologically sort the DAG.

In general the network scanning system 106 may be any implemented using any suitable type of computing device, such as a server, desktop, laptop, mobile phone (or smartphone), tablet, kiosk, wireless device, etc. In some embodiments, the network scanning system 106 may be implemented using the network-accessible services system 110.

For example, the network scanning system 106 may be implemented in one or more VM instances (e.g., as described below) to determine which functions are to be executed. In such an example, another service, such as a workflow management service 170, implemented using the network-accessible services system 110 may receive identifying information of functions that are to be executed. The workflow management service 170 may use the identifying information to cause the functions to be executed by the network-accessible services system 110. In a more particular example, the workflow management service 170 may request work that is ready to be executed from the network scanning system 106, which may determine functions that are ready to execute and provide information that the workflow management system may use to cause the functions to be executed (e.g., identifying information, code, etc.). The workflow management service 170 may return results of the functions when they become available and/or when all functions have completed execution (or otherwise completed, such as by failing to complete within a certain time). For example, when each function executes it may update a information in the data store 109 indicating whether the function successfully executed, an ID of the target, and its results. The workflow management system may be programmed to check the data store 109 periodically or in response to updates to it by the functions. After returning results, the workflow management service 170 may request more functions to be executed, which may be determined from the DAG. In some embodiments, the network scanning system 106 may cause the functions to be executed using the workflow management service 170 regardless of whether the network scanning system 106 is implemented within the network-accessible services system 110, For example, the network scanning system 106 may submit a request to use the workflow management system 170 to perform the network scan through the frontend 120.

In some embodiments, the scan target 108 may be one or more computing devices and/or services that are to be tested using the network vulnerability scan specified by the network vulnerability information 106A. In some embodiments, the scan target may be implemented using the network-accessible services system 110. For example, as described above, the scan target 108 may be associated with a service provided through the network-accessible services system 110, such as a service operated by the service provider or a service operated by a customer using infrastructure and/or services offered by the service provider. In such an example, the amount of compute-resources available to the scan target 108 may vary based on the demand for the service at any given time, unlike situations in which a service is provided from a set number of physical servers where the compute resources available are generally fixed. In a more particular example, the service may always be available on short notice, but if there is no demand the scan target 108 may cease to exist and/or operate. In some embodiments, the amount that a service provider must pay to provide their service through the scan target 108 as implemented using the network-accessible services system 110 may be determined based on the amount of compute-resources used by the scan target 108. Executing functions in discrete groups when the scan target 108 is available may reduce the likelihood that the network vulnerability scan will cause the amount of compute resources being used to drastically increase, which could potentially be very expensive for the service provider. Further, unlike physical servers which may be taken offline to be scanned or may be scanned during periods of low demand when the scan would likely not adversely impact provision of the service, when the scan target 108 is implemented using a system such as the network-accessible services system 110 it cannot be conveniently scanned if taken offline or during a lull in demand because the compute resources to perform the scan would no longer be available in such a situation.

The computing environment 100 may be one of any suitable type and/or configuration of a compute resource virtualization platform implemented on one or more physical computing devices. Non-limiting examples of a computing environment 100 include data centers, clusters of data centers organized into zones or regions, a public or private cloud environment, and the like.

In general, the user computing devices 102 may be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things ("IoT") devices such as Internet appliances and connected devices. The network-accessible services system 110 may provide the user computing devices 102 with one or more user interfaces, command-line interfaces ("CLI"), application programming interfaces ("API"), and/or other programmatic interfaces for generating and uploading user codes, invoking the user codes (e.g., submitting a request to execute the user codes on the network-accessible services system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces. In some embodiments, one or more users (e.g., a developer, an owner, an administrator, etc.) associated with the network vulnerability scan may use computing device 102 to interact with the network scanning system 106 and/or the network-accessible services system 110 to initiate and/or access results related to the network vulnerability scan. For example, a user of computing device 102 may use computing device 102 to generate the network vulnerability scan information 106A, and/or provide the network vulnerability scan information 106A to the network scanning system 106 and/or the network-accessible services system 110. As another example, a user of computing device 102 may use computing device 102 to access raw results of the functions being executed by the network-accessible services system 110, to access an analysis performed by another computing device (e.g., the network scanning system 106 and/or the network-accessible services system 110).

The user computing devices 102 and the network scanning system 106 access the network-accessible services system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications ("GSM") network, a Code Division Multiple Access ("CDMA") network, a Long Term Evolution ("LTE") network, or any other type of wireless network. The network 104 may use protocols and components for communicating via the Internet or any of the other aforementioned types of networks. For example, the protocols used by the network 104 may include Hypertext Transfer Protocol ("HTTP"), HTTPS, Message Queue Telemetry Transport ("MQTT"), Constrained Application Protocol ("CoAP"), and the like. Protocols and components for communicating via the Internet or any of the other aforementioned types of communication networks are well known to those skilled in the art and, thus, are not described in more detail herein.

The network-accessible services system 110 is depicted in FIG. 1 as operating in a distributed computing environment including several computer systems that are interconnected using one or more computer networks. The network-accessible services system 110 could also operate within a computing environment having a fewer or greater number of devices than are illustrated in FIG. 1. Thus, the depiction of the network-accessible services system 110 in FIG. 1 should be taken as illustrative and not limiting to the present disclosure. For example, the network-accessible services system 110 or various constituents thereof could implement various Web services components, hosted or "cloud" computing environments, and/or peer-to-peer network configurations to implement at least a portion of the processes described herein.

Further, the network-accessible services system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the computing environment 100 includes a network-accessible services system 110, which includes an electronic data store 109, a frontend 120, a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the network-accessible services system 110 is logical in nature and one or more of the components may be implemented by a single computing device or multiple computing devices. For example, the instances 152, 154, 156, 158 may be implemented on one or more physical computing devices in different various geographic regions. Similarly, each of the frontend 120, the warming pool manager 130, and the worker manager 140 may be implemented across multiple physical computing devices. Alternatively, one or more of the frontend 120, the warming pool manager 130, and the worker manager 140 may be implemented on a single physical computing device. In some embodiments, the network-accessible services system 110 may comprise multiple electronic data stores, multiple frontends, multiple warming pool managers, and/or multiple worker managers. Although four virtual machine instances are shown in the example of FIG. 1, the embodiments described herein are not limited as such, and one skilled in the art will appreciate that the network-accessible services system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the network-accessible services system 110 may comprise any number of warming pools and active pools. Although the electronic data store 109 is shown as being part of network-accessible services system 110, the electronic data store may be implemented using any hardware and/or software, at any suitable location. For example, the electronic data store 109 may be implemented as part of the network scanning system 106. As another example, the electronic data store 109 may be implemented as part of a device that communicates with the network scanning system 106 and/or the network-accessible services system 110 through network 104.

In the example of FIG. 1, the network-accessible services system 110 is illustrated as being connected to the network 104. In some embodiments, any of the components within the network-accessible services system 110 may communicate with other components (e.g., the user computing devices 102, network scanning system 106, scan target 108, and/or other services that may communicate with the network-accessible services system 110) of the computing environment 100 via the network 104. In other embodiments, not all components of the network-accessible services system 110 are capable of communicating with other components of the computing environment 100. In one example, only the frontend 120 may be connected to the network 104, and other components of the network-accessible services system 110 may communicate with other components of the computing environment 100 via the frontend 120.

Computing devices may use the network-accessible services system 110 to execute one or more functions thereon. For example, the network scanning system 106 may be configured to request that one or more functions from a network vulnerability scan be performed. One way of executing the functions is to acquire virtual machine instances from service providers who provide infrastructure as a service, configure the virtual machine instances to suit the needs of the network scanning system 106, and use the configured virtual machine instances to execute the functions. Alternatively, the network scanning system 106 may send a request to execute one or more functions to the network-accessible services system 110. The network-accessible services system 110 may handle the acquisition and configuration of compute capacity (e.g., containers, instances, etc., which are described in greater detail below) based on the request, and execute the code using the compute capacity. The network-accessible services system 110 may automatically scale up and down based on the volume by executing additional copies of the functions, thereby relieving the network scanning system 106 from the burden of having to manage over-utilization (e.g., acquiring too little computing resources and suffering performance issues) or under-utilization (e.g., acquiring more computing resources than necessary to run the codes, and thus overpaying).

The frontend 120 receives and processes all the requests (sometimes in the form of event messages) to execute functions on the network-accessible services system 110. In one embodiment, the frontend 120 serves as a front door to all the other services provided by the network-accessible services system 110. The frontend 120 processes the requests received from network scanning device 106, computing devices 102 and/or generated, for example, in response to events, and makes sure that the requests are properly authorized. For example, the frontend 120 may determine whether the network scanning system 106 associated with the request is authorized to run the function(s) specified in the request. In some embodiments, such as embodiments in which the network scanning system 106 is executed by the network-accessible services system 110, the frontend 120 may receive requests and/or any other suitable information directed to the network scanning system 106, such as requests to initiate a network scan of a particular target 108. In some embodiments, requests and/or events may be processed by an event/request processing module 160. For example, the event/request processing module 160 may process an event message for a request to execute one or more functions, as described herein. In another embodiment, a separate polling service may be implemented, for example via a polling fleet configured to poll an event source or a message queue and perform at least an initial message conversion or processing to prepare the event message for further processing by the frontend 120 and/or another component of the network-accessible services system 110. In some embodiments, the event/request processing module 160 may periodically poll for event messages to be processed into requests to execute one or more functions. For example, the event/request processing module 160 may periodically access a message queue to determine and/or detect whether an event message has been placed in the message queue for processing by the network-accessible services system 110. In response to determining and/or detecting an event message in the message queue, the event/request processing module 160 may retrieve the message event from the message queue and initiate further processing of the event message. In some embodiments, the event/request processing module 160 may poll an event-triggering service directly rather than from a message queue. For example, some event-triggering services such as certain types of databases may support direct polling of event messages that need not necessarily rely on an intermediary message queue. In some embodiments, the event/request processing module 160 may manage the conversion of the event message (e.g., as accessed or retrieved from a message queue) into a request to execute one or more functions. Additionally, in some embodiments, the event message may be generated in a format representative of a remote procedure call to facilitate rapid conversion and/or immediate function invocation by the network-accessible services system 110 when the event message is processed. Such embodiments may enable a high degree of functional transparency and reduced latency between an auxiliary system responding to an event trigger and the network-accessible services system 110 processing the event message generated by the auxiliary system responsive to the event trigger. While the event/request processing module 160 is shown as part of the frontend 120, in some embodiments, all or a portion of the event/request processing module 160 may be implemented by other components of the network-accessible services system 110 and/or another computing device. For example, in some embodiments, another computing device in communication with the network-accessible services system 110 may include several modules or components that operate similarly to the modules and components illustrated as part of the frontend 120. In some embodiments, the frontend 120 may further include other components than are shown in FIG. 1.

The functions as used herein may refer to any program code (e.g., a program, routine, subroutine, thread, etc.) written in a specific program language. In the present disclosure, the terms "function," "code," "user code," and "program code," may be used interchangeably. Such functions may be executed to achieve a specific task, for example, in connection with an event generated by the network scanning system 106. For example, the functions may be written in JavaScript (node.js), Java, Python, and/or Ruby. The request and/or corresponding event message may include an identifier to identify the function, the code used to execute the function (or the location thereof), and one or more arguments to be used for executing the function. For example, the network scanning system 106 may provide the function along with the request to execute the function in response to the occurrence of one or more events. In another example, the request may identify previously uploaded program code (e.g., using the API for uploading the code) by its name or its unique ID and one or more triggering conditions for executing the function. In yet another example, the function may be included in the request as well as uploaded in a separate location (e.g., the electronic data store 109, or another storage system internal to the network-accessible services system 110) prior to the request being received by the network-accessible services system 110. The network-accessible services system 110 may vary its code execution strategy based on where the code for executing a function is available at the time the request is processed. In some embodiments, a function, when executed, may cause the computing device executing the function to transmit information (e.g., a payload) to one or more devices (e.g., the scan target 108). Additionally or alternatively, in some embodiments, a function may not cause information to be transmitted from a computing device executing the function.

The frontend 120 may receive the request to execute such functions in response to HTTPS requests from a computing device or in response to triggering events. Also, any information (e.g., headers and parameters) included in the HTTPS request may also be processed and utilized when executing the user code. As discussed above, any other protocols, including, for example, HTTP, MQTT, and CoAP, may be used to transfer a message containing the request to execute one or more functions to the frontend 120. In some embodiments, the frontend 120 may include a web service and/or may expose a web service HTTPS (or any other suitable protocol) API that may be used to submit requests to execute functions, requests to execute a network scan (e.g., in cases in which the network scanning system is executed by the network-accessible services system 110). The frontend 120 may also receive the request to execute such functions when an event is detected, such as an event that the network scanning system 106 has registered to trigger automatic request generation. For example, the network scanning system 106 may have registered a timed job (e.g., execute functions every 24 hours). In such an example, when the scheduled time arrives for the timed job, the request to execute the one or more functions may be sent to the frontend 120. In another example, the frontend 120 may include or have access to a queue of incoming requests for executing one or more functions, and when the request to execute one or more functions queued by the network scanning system 106 is removed from the work queue of the network-accessible services system 110, the frontend 120 may process the request. In yet another example, the request may originate from another component within the network-accessible services system 110 or other servers or services not illustrated in FIG. 1.

A request to execute one or more functions sent by the network scanning system 106 may specify one or more third-party libraries (including native libraries) to be used along with a function. In one embodiment, the request includes a package file (for example, a compressed file, a ZIP file, a RAR file, etc.) containing the code for executing the function and any libraries (and/or identifications of storage locations thereof). In some embodiments, the request includes metadata that indicates program code to be used to execute the function, the language in which the program code is written, the network scanning system 106 associated with the request, and/or the computing resources (e.g., memory, etc.) to be reserved for executing the function. For example, program code for executing the function may be provided with the request, previously uploaded, provided by the network-accessible services system 110 (e.g., standard routines), and/or provided by third parties.

In some embodiments, the network-accessible services system 110 may include multiple frontends 120. In such embodiments, a load balancer may be provided to distribute the incoming requests and/or event messages to the multiple frontends 120, for example, in a round-robin fashion.

The warming pool manager 130 ensures that virtual machine instances are ready to be used by the worker manager 140 when the network-accessible services system 110 receives a request to execute one or more functions using the network-accessible services system 110. In the example illustrated in FIG. 1, the warming pool manager 130 manages the warming pool 130A, which is a group (sometimes referred to as a pool) of pre-initialized and pre-configured virtual machine instances that may be used to service incoming requests. In some embodiments, the warming pool manager 130 causes virtual machine instances to be booted up on one or more physical computing machines within the network-accessible services system 110 and added to the warming pool 130A prior to receiving a code execution request that will be executed on the virtual machine instance. In other embodiments, the warming pool manager 130 communicates with an auxiliary virtual machine instance service to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the network-accessible services system 110 and one or more virtual machine instance services to acquire and maintain compute capacity that may be used to service code execution requests received by the frontend 120. In some embodiments, the network-accessible services system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A may be configured based on a predetermined set of configurations independent from a specific request to execute one or more functions. The predetermined set of configurations may correspond to various types of virtual machine instances to execute user codes. The warming pool manager 130 may optimize types and numbers of virtual machine instances in the warming pool 130A based on one or more metrics related to current or previous user code executions.

As shown in FIG. 1, instances may have operating systems ("OS") and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any requests from any suitable computing device. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the request to execute one or more functions on the network-accessible services system 110. In one embodiment, the operating conditions may include program languages in which the potential functions may be written. For example, such languages may include Java, JavaScript, Python, Ruby, and the like. In some embodiments, the set of languages that the functions may be written in may be limited to a predetermined set (e.g., set of 4 languages, although in some embodiments sets of more or less than four languages are provided) in order to facilitate pre-initialization of the virtual machine instances that may satisfy requests to execute functions. For example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); etc.

The worker manager 140 manages the instances used for servicing incoming requests to execute functions. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group may utilize resources on the instance. For example, the users in the same group may belong to the same security group (e.g., based on their security credentials) such that executing requests from the network scanning system 106 in a container on a particular instance after another code has been executed in another container on the same instance does not pose security risks. Similarly, the worker manager 140 may assign the instances and the containers according to one or more policies that dictate which requests may be executed in which containers and which instances may be assigned to which users. An example policy may specify that instances are assigned to collections of users who share the same account (e.g., account for accessing the services provided by the network-accessible services system 110). In some embodiments, requests associated with the group of network scanning systems 106 may share the same containers (e.g., if the functions associated therewith are identical). In some embodiments, the worker manager 140 may include an instance allocation unit for finding compute capacity (e.g., containers) to service incoming requests to execute functions and a function execution module for facilitating the execution of functions on those containers.

As shown in FIG. 1, instances may have OSs, language runtimes, and containers. The containers may have individual copies of the OS and the runtimes and functions loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a function 156D-1. The container 156E includes a copy of the OS 156A, a copy of the runtime 156C, and a copy of a function 156E-1. The instance 158 has an OS 158A, runtimes 158B, 158C, 158E, 158F, a container 158D, and functions 158G, 158H. The container 158D has a copy of the OS 158A, a copy of the runtime 158B, and a copy of a function 158D-1. As illustrated in FIG. 1, instances may have functions loaded thereon, and containers within those instances may also have functions loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, functions are executed in isolated compute systems referred to as containers (e.g., containers 156D, 156E, 158D). Containers are logical units created within a virtual machine instance using the resources available on that instance. For example, the worker manager 140 may, based on information specified in the request to execute one or more functions, create a new container or locate an existing container in one of the instances in the active pool 140A and assign the container to the request to handle the execution of the function associated with the request. In one embodiment, such containers are implemented as Linux containers. The virtual machine instances in the active pool 140A may have one or more containers created thereon and have one or more functions that may be used to perform a network vulnerability scan loaded thereon (e.g., either in one of the containers or in a local cache of the instance). Each container may have credential information made available therein, so that functions being executed on the container have access to whatever the corresponding credential information allows them to access.

Once a request has been successfully processed by the frontend 120, the worker manager 140 finds capacity to service the request to execute user code on the network-accessible services system 110. For example, if there exists a particular virtual machine instance in the active pool 140A that has a container with the same user code loaded therein (e.g., code 156D-1 shown in the container 156D), the worker manager 140 may assign the container to the request and cause the function to be executed in the container. Alternatively, if the function is available in the local cache of one of the virtual machine instances (e.g., functions 158G, 158H, which are stored on the instance 158 but do not belong to any individual containers), the worker manager 140 may create a new container on such an instance, assign the container to the request, and cause the function to be loaded and executed in the container.

If the worker manager 140 determines that the function associated with the request is not found on any of the instances (e.g., either in a container or the local cache of an instance) in the active pool 140A, the worker manager 140 may determine whether any of the instances in the active pool 140A is currently associated with the request and has compute capacity to handle the current request. If there is such an instance, the worker manager 140 may create a new container on the instance and assign the container to the request. Alternatively, the worker manager 140 may further configure an existing container on the instance assigned to execute functions associated with the network vulnerability scan, and assign the container to the request. For example, the worker manager 140 may determine that the existing container may be used to execute a particular function if a particular library demanded by the currently requested function is loaded thereon. In such a case, the worker manager 140 may load the particular library and the function onto the container and use the container to execute the function.

If the active pool 140A does not contain any instances currently assigned to the network scanning system 106, the worker manager 140 pulls a new virtual machine instance from the warming pool 130A, assigns the instance to the network scanning system 106 associated with the request, creates a new container on the instance, assigns the container to the request, and causes the function to be downloaded and executed on the container. In some embodiments, program code for executing the function may be downloaded from an auxiliary service.

In some embodiments, electronic data store 109 may be used to store results generated by functions executed by the network-accessible services system 110. For example, information that is generated as a result of a function executed by the network-accessible services system 110 may be stored in the electronic data store 109 in association with identifying information of the function. As another example, information received from the scan target 108 in response to messages sent by the network-accessible services system 110 during execution of a function may be stored in the electronic data store 109 in association with identifying information of the function. In some embodiments, the electronic data store 109 may store the information using any suitable data structure, such as a relational database, a non-relational database, or any other suitable data structure. In some embodiments, storing the information in electronic data store 109 may facilitate performing a network vulnerability scan during a series of discrete time periods that may not overlap, rather than performing the scan straight through from beginning to end. For example, the results of a first group of functions executed by the network-accessible services system 110 may be stored in the electronic data store 109, and at a later time when a second group of functions are to be executed, any results that are required in order to execute the second group of functions may be retrieved and used by the network-accessible services system 110. In such an example, the information stored in electronic data store 109 may be used as a checkpoint such that the network vulnerability scan may be paused while the scan target 108 is unavailable, and when the scan target 108 becomes available again, the network vulnerability scan may resume and execute the next group of functions that were ready to execute when the scan target became unavailable. Although only the electronic data store 109 is illustrated in the example of FIG. 1, the computing environment 100 may include other levels of storage systems from which program code for executing functions may be downloaded, and/or to which results may be saved. For example, each instance may have one or more storage systems either physically (e.g., a local storage resident on the physical computing system on which the instance is running) or logically (e.g., a network-attached storage system in network communication with the instance and provided within or outside of the network-accessible services system 110) associated with the instance on which the container is created. Alternatively, the code may be downloaded from a web-based data store provided by the electronic data store 109.

Once the worker manager 140 locates one of the virtual machine instances in the warming pool 130A that may be used to serve the request to execute one or more functions, the warming pool manager 130 or the worker manger 140 takes the instance out of the warming pool 130A and assigns it to the network scanning system associated with the request. The assigned virtual machine instance is taken out of the warming pool 130A and placed in the active pool 140A. In some embodiments, once the virtual machine instance has been assigned to the network scanning system 106, the same virtual machine instance cannot be used to service requests of any other user. This provides security benefits to users by preventing possible co-mingling of resources. Alternatively, in some embodiments, multiple containers belonging to different users (or assigned to requests associated with different users) may co-exist on a single virtual machine instance. Such an approach may improve utilization of the available compute capacity.

In some embodiments, the network-accessible services system 110 may maintain a separate cache in which functions are stored to serve as an intermediate level of caching system between the local cache of the virtual machine instances and a web-based network storage (e.g., accessible via the network 104).

After a particular function has been executed, the worker manager 140 may tear down the container used to execute the function to free up the resources it occupied to be used for other containers in the instance. Alternatively, the worker manager 140 may keep the container running to use it to service additional requests from the same user. For example, if another request associated with the same function that has already been loaded in the container, the request may be assigned to the same container, thereby eliminating the delay associated with creating a new container and loading the function in the container. In some embodiments, the worker manager 140 may tear down the instance in which the container used to execute the function was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shut down (e.g., deleted, terminated, etc.), and resources allocated thereto are released. In some embodiments, the threshold time passed before a container is torn down is shorter than the threshold time passed before an instance is torn down.

In some embodiments, the network-accessible services system 110 is adapted to begin execution of the function shortly after it is received (e.g., by the frontend 120).

The worker manager 140 may include an instance allocation unit for finding compute capacity (e.g., containers) to service incoming code execution requests and a user code execution module for facilitating the execution of user codes on those containers. An example configuration of the network scanning system is described in greater detail below with reference to FIG. 2.

Figure 2:
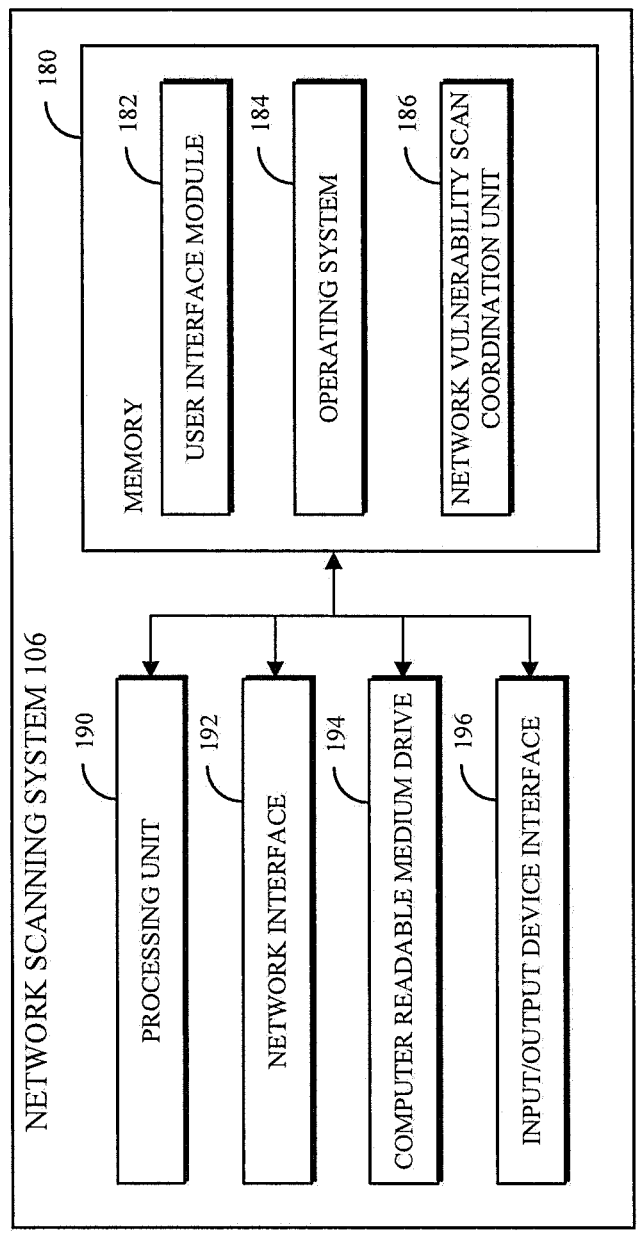
FIG. 2 is a block diagram of an exemplary computing device architecture providing a frontend for processing user requests to execute program codes.

FIG. 2 depicts a general architecture of a computing system (referenced as network scanning system 106) that identifies functions for performing a network vulnerability scan that are ready to execute, and causes the network-accessible services system 110 to execute the functions that are ready to execute. The general architecture of the network scanning system 106 depicted in FIG. 2 includes an arrangement of computer hardware and software modules that may be used to implement aspects of the present disclosure. The hardware modules may be implemented with physical electronic devices, as discussed in greater detail below. The network scanning system 106 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the network scanning system 106 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface module 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to, in combination with, and/or in lieu of the user interface module 182, the memory 180 may include a network vulnerability scan coordination unit 186 that may be executed by the processing unit 190. In one embodiment, the user interface module 182 and the network vulnerability scan coordination unit 186 individually or collectively implement various aspects of the present disclosure, e.g., generating a DAG based on functions in a network vulnerability scan, identifying functions that are ready to execute, causing the network-accessible services system 110 to execute the functions that are ready to execute, topologically sorting the DAG, etc.

Figure 3:
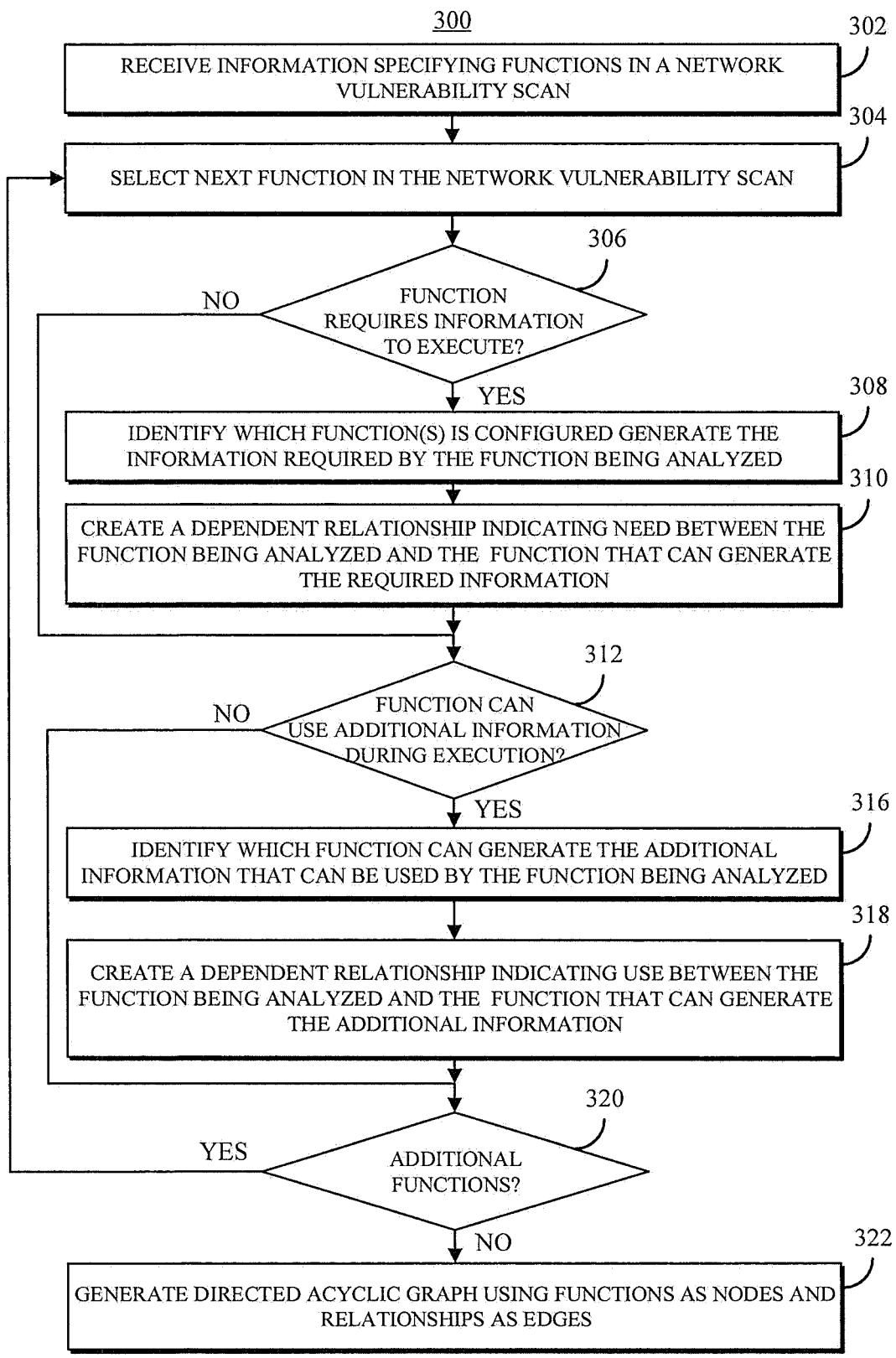
FIG. 3 is a flow diagram of an exemplary method for creating relationships between functions of a network vulnerability scan.

Turning now to FIG. 3, a method 300 implemented by the components of the network scanning system 106, described above, creates relationships between functions of a network vulnerability scan to produce a directed acyclic graph ("DAG") describing the execution of the network vulnerability scan in terms of dependencies between the corresponding tests/tasks (i.e., functions). At 302, the system may receive information specifying functions that may be used in conducting a network vulnerability scan. As described above in connection with FIG. 1, in general, at least a portion of the functions identified in the information received at 302 may never be executed during a network vulnerability scan of a particular scan target. For example, functions that are used to evaluate the security of an SSH server are never executed in cases in which the target is not associated with an SSH server. In some embodiments, a user of the network scanning system 106 may specify functions to be used in performing a network scan. In some such embodiments, the user may specify the functions using any suitable technique or combination of techniques. For example, the user may manually write the code for each function that is to be executed as part of the network scan. As another example, the user may select prewritten functions that are to be included (e.g., from a list of functions) individually and/or in groups. As yet another example, the user may select a type of system to be scanned (e.g., from a list), and the network scanning system may select functions to be executed based the selected system type. Additionally or alternatively, in some embodiments, the network scanning system 106 may select the functions to be used in performing a network scan with or without user input. For example, in some embodiments, the network scanning system may perform a preliminary scan and/or analysis of the request (e.g., based on address information in the request and/or any other information that may be used to characterize the target 108) to select functions to be used in performing the network scan.

The information specifying the functions that may be used in conducting the network vulnerability scan may be formatted in any suitable format, and/or may include any suitable information or combination of information. For example, the information specifying the functions may include program code that may be used to execute the functions. As another example, the information specifying the functions may include identifying information of the functions that may be used to specify which function is to be executed. As yet another example, the information specifying the functions may include information indicating what type of information each function needs (if any), and/or what type of information each function may additionally utilize (if any) although it is not required.

At 304, the system may select a next function in the network vulnerability scan to be analyzed. The system may use any suitable technique to select a next function. For example, the system may select functions in an order in which the functions are presented in the information received at 302. As another example, the system may select functions in a random order. As yet another example, the system may select functions based on size (e.g., number of instructions, number of arguments, etc.). As still another example, the system may select functions in alphabetical and/or numerical order.

At 306, the system may determine whether the function selected at 304 requires information to execute. In some embodiments, the system may use any suitable technique or combination of techniques to determine whether the function requires additional information to execute. For example, the system may analyze code specifying the function to determine whether the code requires an argument that cannot be supplied without executing a different function. As another example, the system may determine whether information associated with the function (e.g., metadata, a comment, etc.) indicates that the function requires a certain type of information, or is only pertinent to a particular situation (e.g., that the function is related to testing the response of an HTTPS server, that the function is related to testing a particular port, etc.). A function may require multiple different types and/or pieces of information, from the multiple different sources (e.g., other functions) to execute; the system may identify each of these dependencies and capture them using a directed edge as described below.

If the system determines that the function selected at 304 does require information to execute ("YES" at 306), the system may move to 308. At 308, the system may determine which function or functions is configured to generate the information required by the function selected at 304. In some embodiments, the system may use any suitable technique or combination of techniques to determine which function generates the data required by the function selected at 304. For example, the information identifying the functions may include information associated with each function indicating, for a particular function, which function or functions (if any) are required to execute before the particular function is ready to execute. As another example, the information identifying the functions may include information associated with each function indicating, for a particular function, which function or functions (if any) produce results that the particular function may use (but which are not necessarily required). As yet another example, the system may analyze the functions to determine whether there is a function that is associated with an operation that is known to generate the data required by the function selected at 304. Note that in some cases, the function may only generate the data required by the function selected at 304 where the target of the scan has certain desired characteristics.

At 310, the system may create a dependent relationship between the function selected at 304 and the function identified at 306. This relationship may indicate that the function identified at 306 is capable of generating information required by the function selected at 304 to execute. In some embodiment, the dependent relationship may be indicated using any suitable technique or combination of techniques. For example, a name or other identifying information of the function identified at 306 may be associated with the function selected at 304.

If the system determines that the function selected at 304 does not require information to execute ("NO" at 306), the system may move to 312. At 312, the system may determine whether the function selected at 304 may use additional information during execution, even if that information is not required for the function to execute. For example, if the function selected at 304 is associated with information indicating that a "parent" function(s) produces results that the selected function may use, the system may identify the selected function as depending from the parent function(s), but not requiring particular results of that parent function(s) to be ready to execute. That is, the selected function may be withheld as not ready to execute until the parent function executes; once the parent function executes, the selected function will be ready to execute even if the result(s) produced by the parent function is not a desired result.

If the system determines that the function selected at 304 is configured to use additional information that is not required ("YES" at 312), the system may move to 316. At 316, the system may determine which function or functions is configured to generate the additional information that may be used by the function selected at 304, using any suitable technique or combination of techniques, such as techniques described above in connection with 308.

At 318, the system may create a dependent relationship between the function selected at 304 and the function identified at 316. This relationship may indicate that the function identified at 316 is capable of generating additional information that may be used by the function selected at 304, but that is not required to execute the function.

If the system determines that the function selected at 304 is not configured to use additional information that is not required ("NO" at 312), the system may move to 320. At 320, the system may determine whether there are any additional functions that have not been analyzed. If, at 320, the system determines that there are additional functions ("YES" at 320), the system may move back to 304 and select a new function that has not yet been analyzed. Otherwise, if the system determines that there are no additional functions ("NO" at 320), the system may move to 322.

At 322, the system may generate a directed acyclic graph using the functions as nodes, and the dependent relationships between the nodes as edges. In some embodiments, the system may use any suitable technique or combination of techniques to create the directed acyclic graph. For example, in some embodiments, the system may topologically sort the DAG such that a dependent function follows all functions that may generate information that is required or useful to the function.

Figure 4:
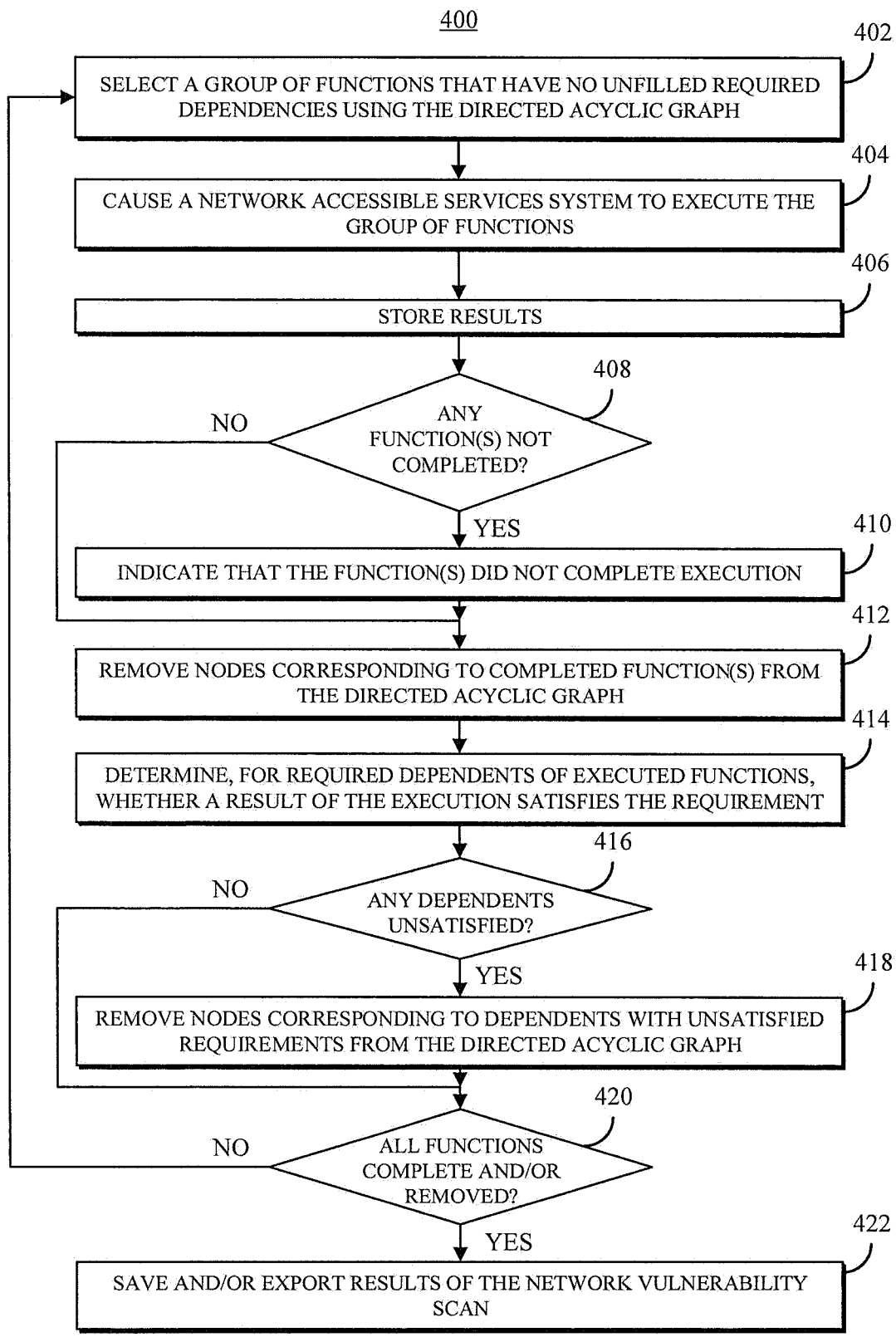
FIG. 4 is a flow diagram of an exemplary method for executing a network vulnerability scan in a distributed computing environment.

In FIG. 4, a method 400 implemented by the components of the network scanning system 106, described above, uses the relationships created by method 300 to cause the network-accessible services system 110 perform functions in the network vulnerability scan. At 402, the system may select a group of functions that have no unfulfilled conditions using the DAG. For example, the system may select one or more functions corresponding to nodes in the DAG that have no edges pointing to them from another node. In some embodiments, the system may select less than the total number of functions that are ready to execute. For example, if the number of functions that are ready to execute is equal to or greater than a threshold, the system may select the group of functions to include less functions. The threshold may be any suitable threshold, such as a number of functions, a number of requests to the target of the scan, a number of lines of code, etc.

At 404, the system may cause the network-accessible services system 110 to execute the group of functions selected at 402. For example, the system may generate one or more request(s) to execute the corresponding function using any suitable format, and may send the request(s) at any suitable time. For example, the system may send the request(s) to the frontend 120 of the network-accessible services system 110 as a request(s) to perform one or more functions. In some embodiments, the system may include with the request(s) information to be used in executing the function(s). Such information may be the information itself (e.g., code to be used to execute the function), identifying information that may be used to retrieve the information (e.g., from the electronic data store 109, from a cached version of the function in memory of a VM instance, from a storage service, etc.), information and/or instructions that specify where the network-accessible services system 110 is to store results generated by executing the functions (e.g., information specifying the electronic data store 109 as a destination to which the results are to be sent), information and/or instructions that specify whether and/or how the network-accessible services system 110 is to communicate results and/or the existence of results to the system, information and/or instructions that specify whether and/or how the network-accessible services system 110 is to communicate that a function has been executed (or that a function failed to execute, failed to completely execute, etc.), and/or any other suitable information. In some embodiments, the system may send information with the request(s) that may be used to identify the scan target 108. For example, because the scan target 108 may be implemented by the network-accessible services system 110, a network address (e.g., an IP address) that corresponded to the scan target 108, may not always correspond to the scan target. In such an example, other information, such as an identifier of the service being provided by at that network address, may be used to check on whether the scan target 108 is still available to be scanned. In some embodiments, prior to causing the group of functions to be executed, the network scanning system 106 may determine whether the scan target 108 is available for scanning using any suitable technique or combination of techniques. For example, the network scanning system 106 may query the network address associated with the scan target 108 to determine whether the network address is still associated with the scan target. Additionally or alternatively, the network-accessible services system 110 may determine whether the scan target 108 is available, and if it is not, wait until the scan target becomes available.

In some embodiments, causing the network-accessible services system 110 to execute the group of functions selected at 402 may include sending code for executing the functions to the network-accessible services system 110 at the time that a request to execute the functions is made. Additionally or alternatively, in some embodiments, the system may send the code for executing the functions to the network-accessible services system 110 at any time prior to requesting that the network-accessible services system 110 execute the functions. For example, the system may send the code for executing functions associated with the network vulnerability scan prior to requesting that the network-accessible services system 110 execute any functions. In some embodiments, the system may request that the network-accessible services system 110 execute functions without ever sending the code for executing the functions to the network-accessible services system 110 (and, in some cases, without ever having access to the code). Additionally, in some embodiments, the network-accessible services system 110 may access the code for executing functions from a source other than the network scanning system 106. For example, the network-accessible services system 110 may download the functions and store the functions in any suitable storage device (e.g., electronic data store 109, working memory, etc.) from a destination specified by the network scanning system 106.

At 406, the system may store results of the execution of the group of functions for later use and/or analysis. In some embodiments, the system may receive the results from the network-accessible services system 110 as they are generated and/or may cause the results to be stored by the network-accessible services system (e.g., in electronic data store 109).

At 408, the system may determine whether any of the functions in the group of functions failed to execute to completion by the network-accessible services system 110. For example, the network-accessible services system 110 may indicate that no response was received from the target of the scan for a particular function for which a response was expected. As another example, the network-accessible services system 110 may indicate that execution of the function timed out, or otherwise did not reach completion.

If the system determines that any functions in the group of functions failed to execute to completion ("YES" at 408), the system may move to 410 and save (e.g., in local memory, in the electronic data store 109, etc.) an indication(s) in association with any function(s) that failed to execute to completion. Otherwise, if the system determines that all functions in the group of functions selected at 402 were successfully executed ("NO" at 408), the system may move to 412.

At 412, the system may remove nodes and/or edges from the DAG that correspond to completed functions. In some embodiments, functions that did not execute to completion (e.g., as determined at 408) are not be removed from the DAG. In some embodiments, the system may cause such functions to be executed multiple times (e.g., the function may be reselected at 402). If the function fails to execute to completion at least a threshold number of times (which may depend on the function), the node corresponding to the function that has repeatedly failed to execute may be removed from the DAG.

At 414, the system may determine, for any nodes that depended from a node being removed from the DAG, whether a condition of the dependent node is satisfied based on the result of the node that has been executed. For example, an edge between two nodes may indicate that the dependent node requires that a non-null result be generated by the function corresponding to the upstream node. If the system determines that no substantive result was generated (e.g., a null result, a failure, etc.), the condition of the dependent node is not satisfied and the dependent node may be removed.

At 416, the system may check whether a required condition of any dependent nodes of the nodes removed at 412 are unsatisfied (e.g., based on the determinations at 414). If any required conditions are unsatisfied ("YES" at 416), the system may move to 418, and remove any dependent nodes which have required conditions that are not satisfied. Additionally, at 418 the system may remove dependents of the removed dependent node that require information that would have been generated by the dependent node if it were executable, and on through the DAG until all dependents that directly or indirectly relied on a removed node are removed.

Otherwise, if the system determines that no conditions are unsatisfied ("NO" at 416), the system may move to 420. At 420, if the system determines that the DAG includes any nodes that have not been executed ("YES" at 420), the system may return to 402 to select a next group of nodes. Otherwise, if the system determines that the DAG does not include any nodes that have not been executed ("NO" at 420), the system may move to 422.

At 422, the system may cause the results generated by the network vulnerability scan to be exported and/or saved for analysis. In some embodiments, the system may export the results to any suitable location.

Figure 5A:
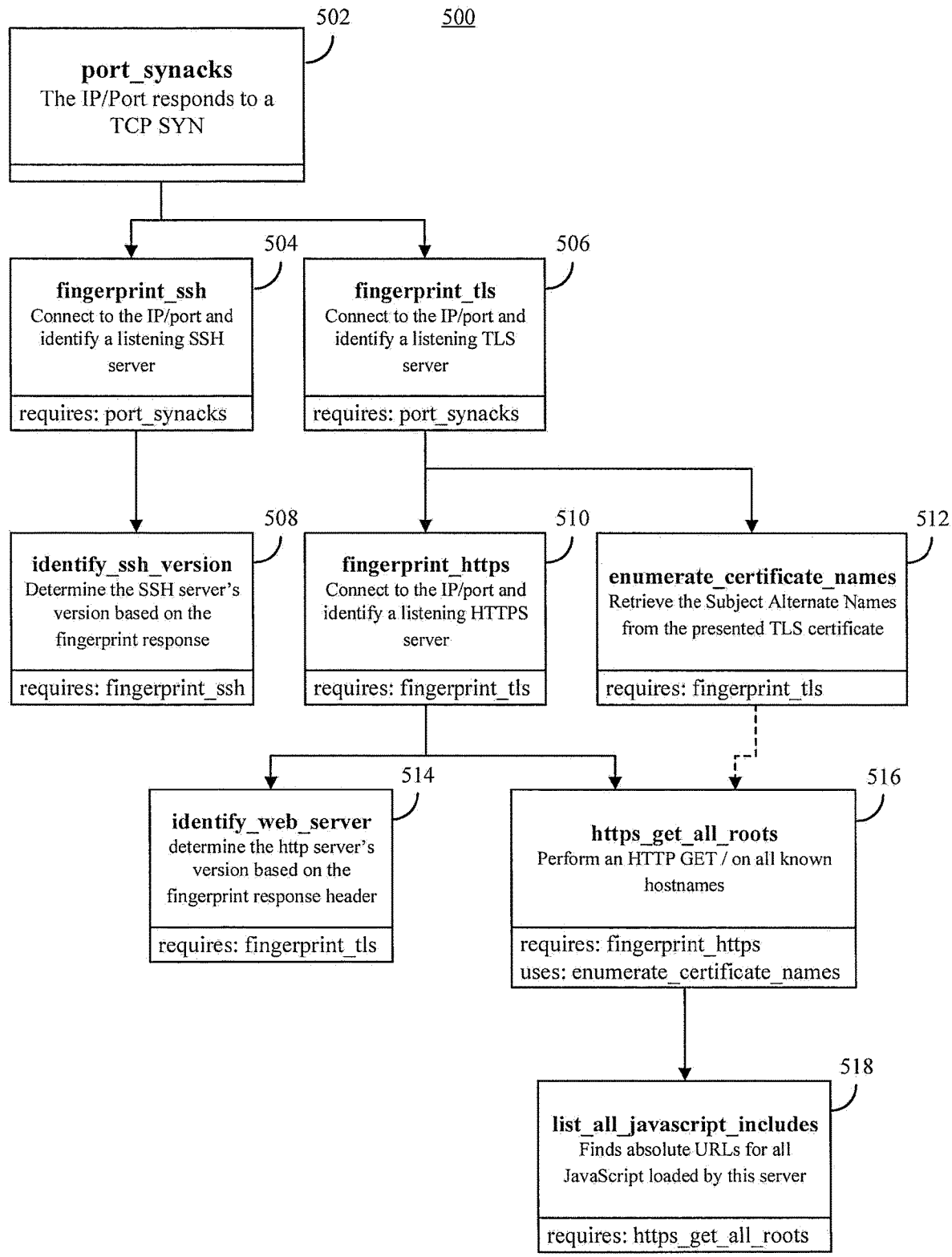
FIGS. 5A-5F illustrate an example of a directed acyclic graph describing relationships between functions in a network vulnerability scan.

FIG. 5A shows a portion of a DAG 500 representing a network vulnerability scan. As shown in FIG. 5A, the DAG 500 includes a first function 502 named "port_synacks" that is not dependent on any other function, which is indicated by the lack of an edge pointing to the port_synacks function 502. The port_synacks function 502 may initiate a Transmission Control Protocol ("TCP") connection with the scan target 108, and may perform at least a portion of a handshake procedure with the IP port of the scan target 108 (e.g., by sending a SYN message). The DAG 500 includes a second function 504 named "fingerprint_ssh" that is dependent from the port_synacks function 502, and a third function 506 named "fingerprint_tls" that is also dependent from the port_synacks function. Both the fingerpint_ssh function 504 and the fingerprint_tls function 506 require that the port_synacks function completed successfully, as these functions cannot execute if a connection to the scan target 108 failed to be established by the port_synacks function 502. This dependency is shown in DAG 500 by edges pointing from the port_synacks function 502 to the fingerprint_ssh function 504 and the fingerprint_tls function 506.

The DAG 500 includes a fourth function 508 named "identify_ssh version" that is dependent from the fingerprint_ssh function 504. The identify_ssh version function 508 requires results from the fingerprint_ssh function 504, which is indicated by the edge pointing from the fingerprint_ssh function 504 to the identify_ssh version function 508. More particularly, the identify_ssh version function 508 requires at least that there is an SSH server associated with scan target 108 that responded to the fingerprint_ssh function 504.

The DAG 500 includes a fifth function 510 named "fingerprint_https" that is dependent from the fingerprint_tls function 506. The fingerprint_https function 510 requires results from the fingerprint_tls function 506, which is indicated by the edge pointing from the fingerprint_tls function 506 to the fingerprint_https function 510. More particularly, the fingerprint_https function 510 requires at least that there is a TLS server associated with scan target 108 that responded to the fingerprint_tls function 506.

The DAG 500 includes a sixth function 512 named "enumerate certificate names" that is dependent from the fingerprint_tls function 506. The enumerate certificate names function 512 requires results from the fingerprint_tls function 506, which is indicated by the edge pointing from the fingerprint_tls function 506 to the enumerate certificate names function 512. More particularly, the fingerprint_https function 510 requires at least that there is a TLS server associated with scan target 108 that responded to the fingerprint_tls function 506.

The DAG 500 includes a seventh function 514 named "identify_web_server" that is dependent from the fingerprint_https function 510. The identify_web_wever function 514 requires results from the fingerprint_https function 510, which is indicated by the edge pointing from the fingerprint_https function 510 to the identify_web_wever function 514. More particularly, the identify_web_server function 514 requires at least that there is an HTTPS server associated with scan target 108 that responded to the fingerprint_https function 510.

The DAG 500 includes an eighth function 516 named "https_get_all_roots" that is dependent from the fingerprint_https function 510, and may use information generated by the enumerate_certificate_names function 512. The https_get_all_roots function 516 requires results from the fingerprint_https function 510, which is indicated by the edge pointing from the fingerprint_https function 510 to the https_get_all_roots function 516, and may use results from the enumerate_certificate_names function 512, which is indicated by the edge pointing from the enumerate_certificate_names function 512 to the https_get_all_roots function 516 shown as a dotted line. More particularly, the https_get_all_roots function 516 requires at least that there is an HTTPS server associated with scan target 108 that responded to the fingerprint_https function 510. Additionally, the https_get_all_roots function 516 may use the results of the enumerate_certificate_names function 512. For example, the https_get_all_roots function 516 may perform a GET operation on an IP address generated by the fingerprint_https function 510, and may perform a GET operation on hostnames generated by the enumerate_certificate_names function 512. In such an example, if the enumerate_certificate_names function 512 returned a null result or failed to execute, the https_get_all_roots function 516 may still function.

Figure 5B:
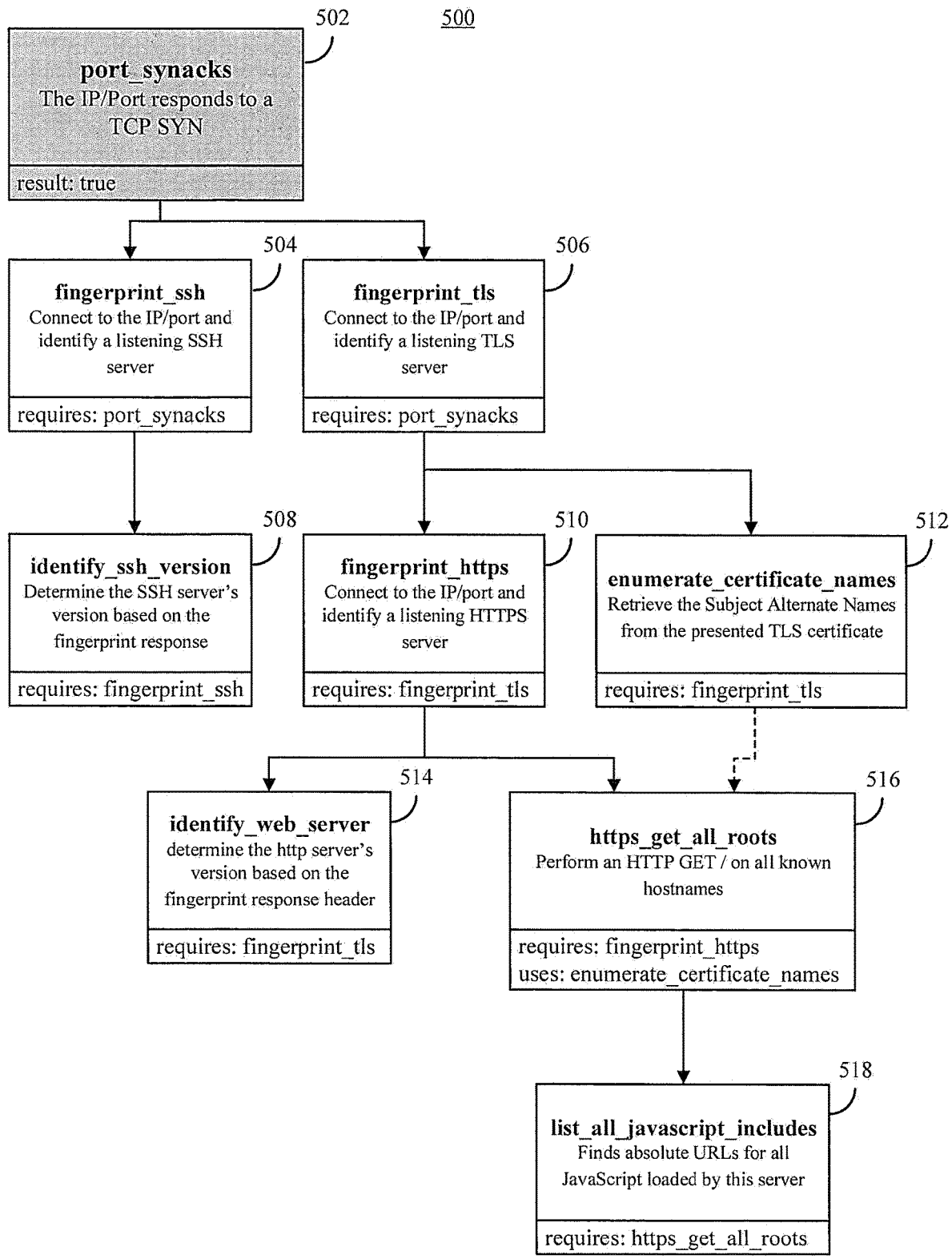

FIG. 5B shows the DAG 500 after the port_synacks function 502 has been executed and returned a result of "true." As described above, the network scanning system 106 removes the port_synacks function 502 from the DAG 500 (indicated in FIG. 5B by the port_synacks function 502 being greyed-out). Additionally, the network scanning system 106 may determine that the conditions for the fingerprint_ssh function 504 and the fingerprint_tls function 506 are satisfied based on the result of the port_synacks function 502.

Figure 5C:
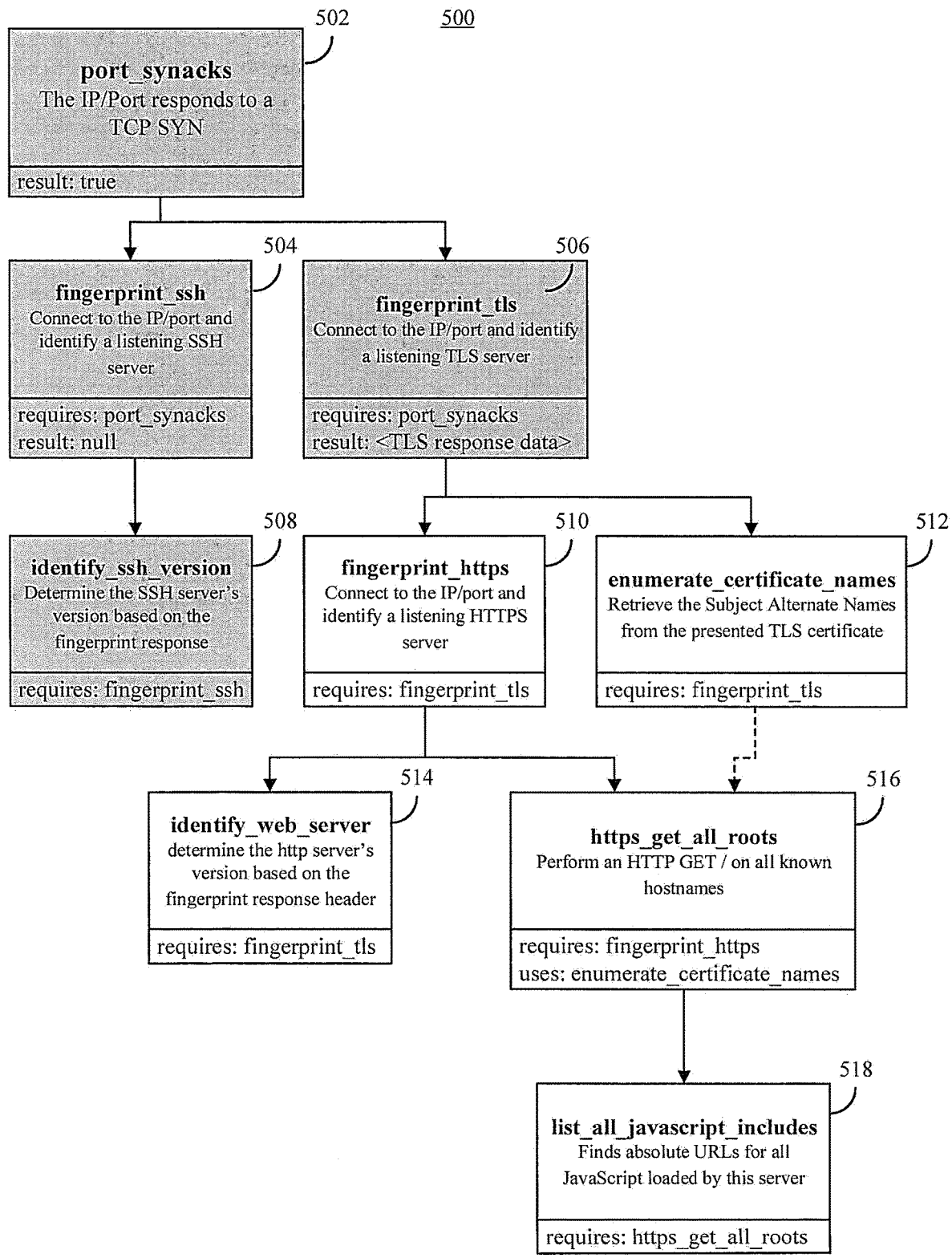

FIG. 5C shows the DAG 500 after the fingerprint_ssh function 504 and the fingerprint_tls function 506 have been executed. As shown in FIG. 5C, the fingerprint_ssh function 504 returned a null result indicating that no response was received from an SSH server associated with the scan target 108. The fingerprint_tls function 506 returned results (e.g., "<TLS response data>") based on information received from a TLS server associated with the scan target 108. As described above, the network scanning system 106 removes the fingerprint_ssh function 504 and the fingerprint_tls function 506 from the DAG 500 (indicated in FIG. 5C by the fingerprint_ssh function 504 and the fingerprint_tls function 506 being greyed-out). Additionally, the network scanning system 106 may determine that the condition for the identify_ssh version function 508, which depends from the fingerprint_ssh function 506 is not satisfied based on the result of the fingerprint_ssh function 506 (e.g., because a null result was returned). The network scanning system 106 removes the identify_ssh version function 508 from the DAG 500.

Figure 5D:
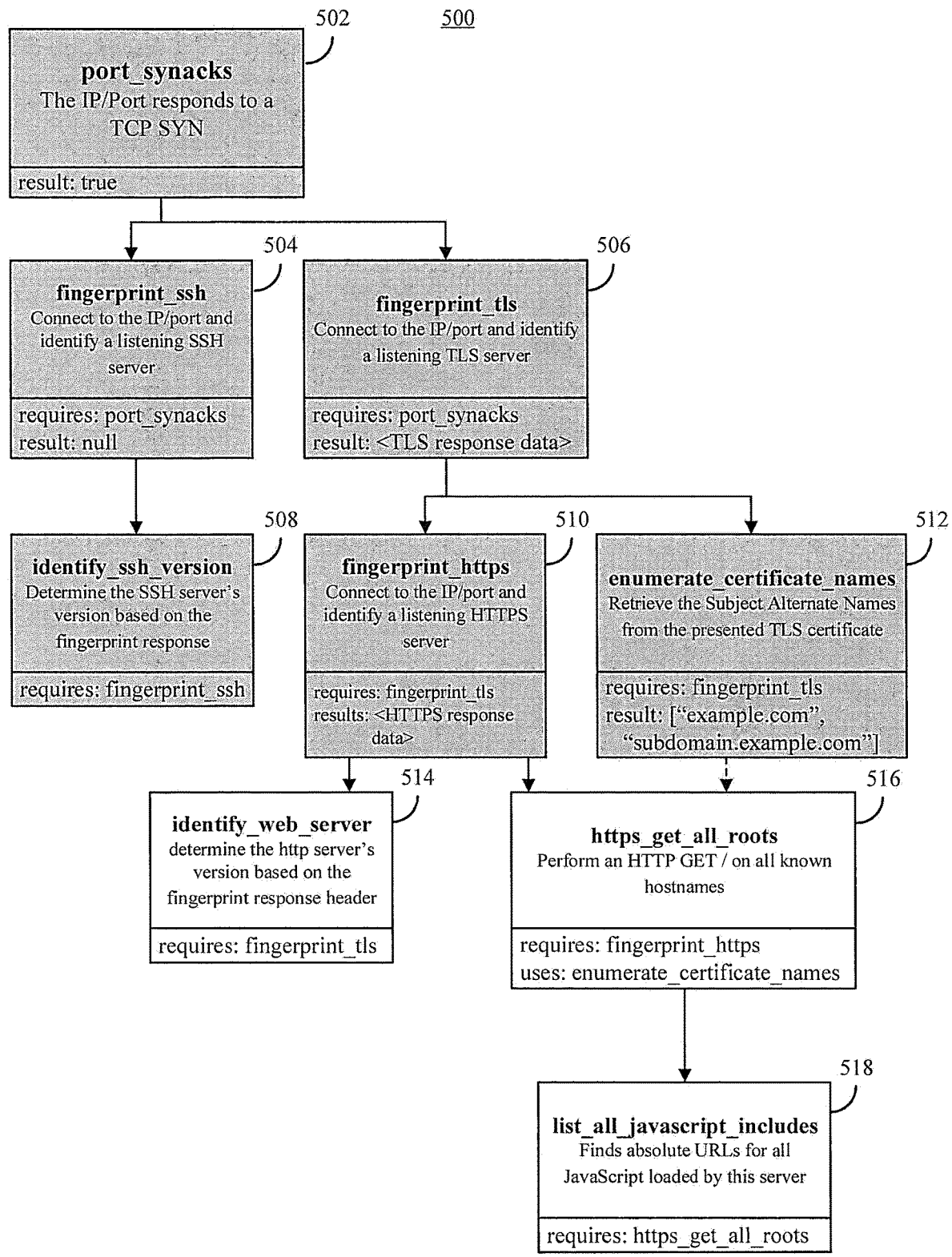

FIG. 5D shows the DAG 500 after the fingerprint_https function 510 and the enumerate_certificate_names function 512 have been executed. As shown in FIG. 5D, the fingerprint_https function 510 returned results (e.g., "<HTTPS response data>") based on information received from an HTTPS server associated with the scan target 108. The enumerate_certificate_names function 512 returned results (e.g., "["example.com", "subdomain.example.com"]") based on information received from the HTTPS server associated with the scan target 108. As described above, the network scanning system 106 removes the fingerprint_https function 510 and the enumerate_certificate_names function 512 from the DAG 500 (indicated in FIG. 5D by the fingerprint_https function 510 and the enumerate_certificate_names function 512 being greyed-out).

Figure 5E:
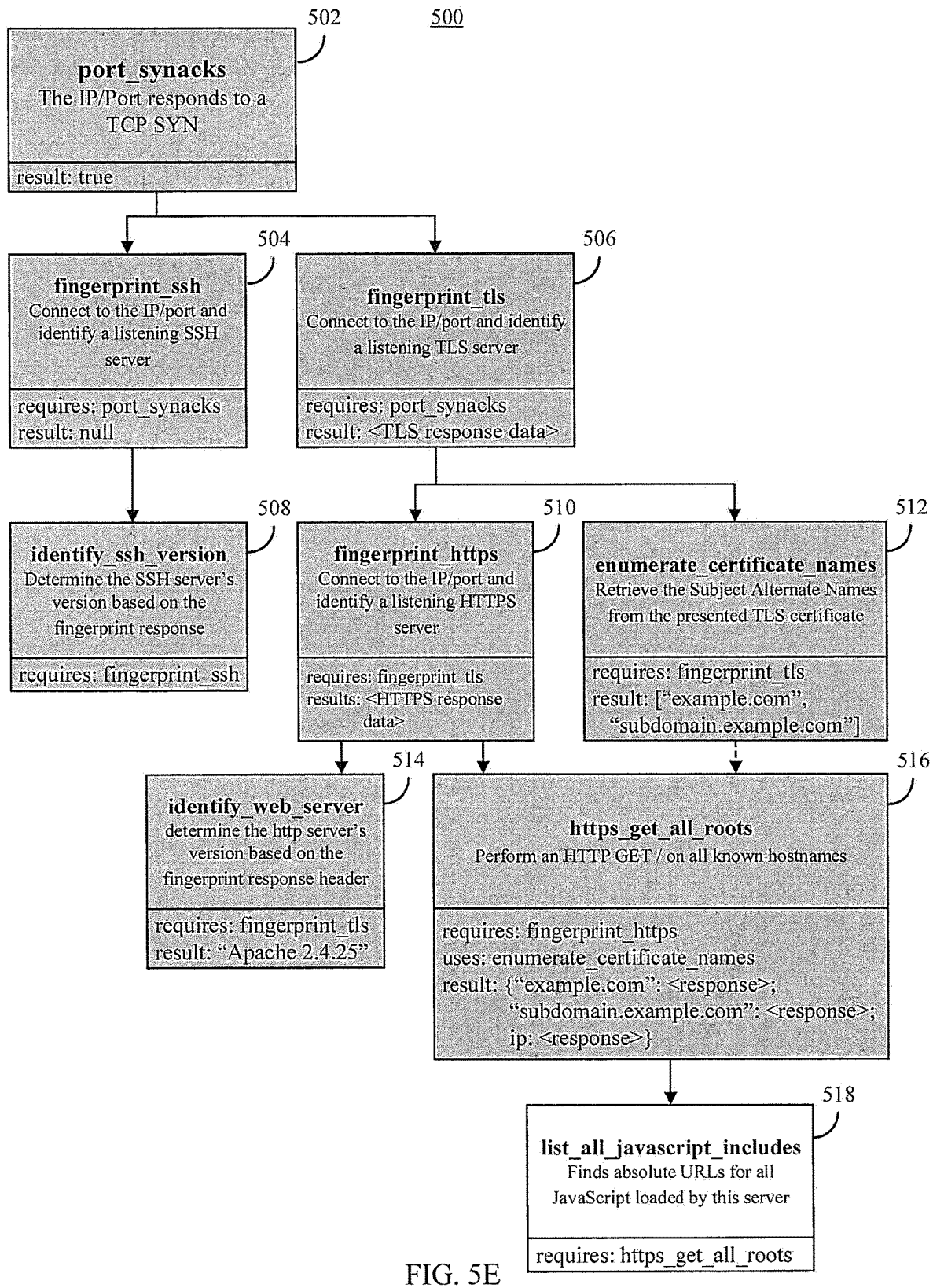

FIG. 5E shows the DAG 500 after the identify_web_server function 514 and the https_get_all_roots function 516 have been executed. As shown in FIG. 5E, the identify_web_server function 514 returned results (e.g., "Apache 2.4.25") based on information received from the HTTPS server associated with the scan target 108. The https_get_all_roots function 516 returned results (e.g., "{"example.com": <response>; "subdomain.example.com": <response>; ip: <response>}") based on information received from the HTTPS server associated with the scan target 108. As described above, the network scanning system 106 removes the identify_web_server function 514 and the https_get_all_roots function 516 from the DAG 500 (indicated in FIG. 5E by the identify_web_server function 514 and the https_get_all_roots function 516 being greyed-out).

Figure 5F:
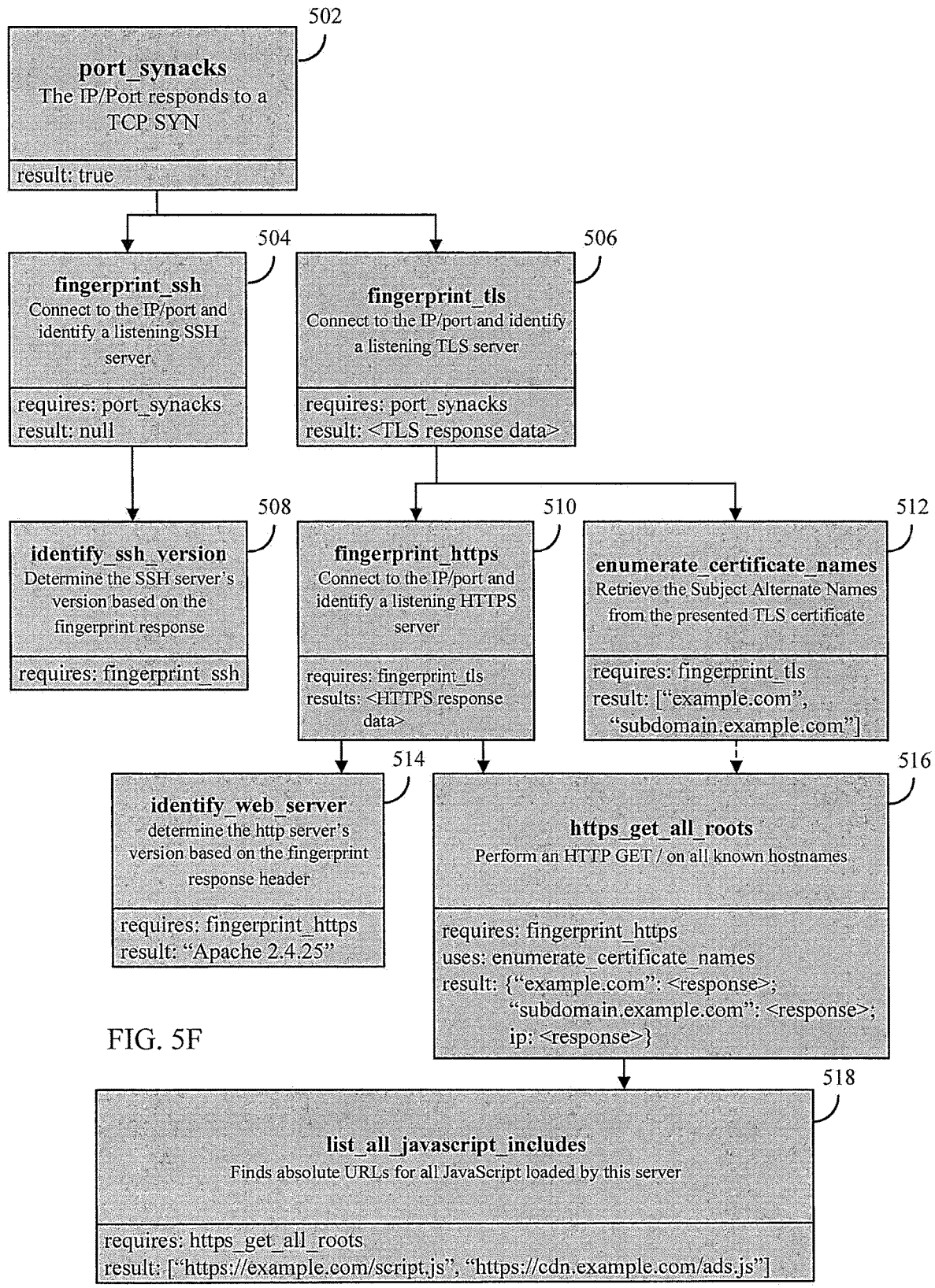

FIG. 5F shows the DAG 500 after the list_all_javascript function 518 has been executed. As shown in FIG. 5f, the list_all_javascript function 518 returned results (e.g., "["https://example.com/script.js", "https://cdn.example.com/ads.js"]") based on information received from the HTTPS server associated with the scan target 108. As described above, the network scanning system 106 removes the list_all_javascript function 518 from the DAG 500 (indicated in FIG. 5F by the list_all_javascript function 518 being greyed-out).

Thus, in one aspect, the present disclosure provides a system that includes an electronic data store configured to store a plurality of results received during a network scan, and a network scanning system in communication with the electronic data store and comprising one or more hardware computing devices configured to execute specific computer-executable instructions. The instructions, upon execution, cause the network scanning system to: receive information identifying a plurality of functions each implementing a corresponding test of the plurality of tests, the plurality of functions including a first function corresponding to a first test of the plurality of tests, and a second function corresponding to a second test of the plurality of tests, the second test identifying a first condition and a first result, of the first test, that satisfies the first condition; select, from the plurality of functions, a first group of functions that are ready to execute, the first group including the first function; cause a network accessible services system to execute the first group of functions in parallel to perform a first portion of the network scan on a first target, the first result being produced by executing the first function and being stored in the electronic data store; obtain the first result; determine that the first result satisfies the first condition; determine, based on the first result satisfying the first condition, that the second function is ready to execute; select, from the plurality of functions subsequent to execution of the first group of functions, a second group of functions that are ready to execute, the second group including the second function; and, cause the network accessible services system to execute the second group of functions in parallel.

The one or more hardware computing devices may be further configured to execute specific computer-executable instructions that upon execution cause the network scanning system to: determine, prior to execution of the first function, that the first result is related to the first condition; create a first dependency relationship between the first function and the second function; determine, prior to execution of the second function, that the second test produces a second result related to a second condition; create a second dependency relationship between the second function and a third function corresponding to a third test of the plurality of tests, the third test identifying the second condition, wherein the second dependency relationship indicates that the third function depends on the second function; and, generate a directed acyclic graph including a first node associated with the first function, a second node associated with the second function, a third node associated with the third function, and a first edge pointing from the first node toward the second node and a second edge pointing from the second node toward the third node. The one or more hardware computing devices may be further configured to execute specific computer-executable instructions that upon execution cause the network scanning system to: select the first group of functions by selecting a first group of nodes from the directed acyclic graph that have no edges pointing toward them; subsequent to the first group of functions being executed, remove from the directed acyclic graph a second group of nodes corresponding to functions that have been executed and a third group of nodes corresponding to functions for which a corresponding condition was not satisfied; and, select the second group of functions by selecting a fourth group of nodes from the acyclic graph that have no edges pointing toward them.

The information identifying the plurality of functions may also identify a third function corresponding to a third test of the plurality of tests, and a plurality of dependent functions that require execution of the third function in order to be ready for execution, wherein to be ready for execution, the third function requires a second condition to be satisfied, the second condition being dependent upon the first result. The one or more hardware computing devices may be further configured to execute specific computer-executable instructions that upon execution cause the network scanning system to determine that the first result does not satisfy the second condition, and determine that the third function and the plurality of dependent functions are not required to be executed to complete the network scan for the first target. The one or more hardware computing devices may be further configured to execute specific computer-executable instructions that upon execution cause the network scanning system to, subsequent to causing the network accessible services system to execute the second group of functions: determine that a third function in the second group of functions did not execute to completion; select a third group of functions that are ready to execute, the third group of functions including the third function; and, cause the network accessible services system to execute the third group of functions.

In another aspect, the present disclosure provides a system including one or more hardware computing devices configured to execute specific computer-executable instructions. Upon execution, the instructions cause the one or more hardware computing devices to: select, from a plurality of functions implementing a network scan of a target, a first group of functions that are ready to execute, the first group of functions including a first function and a second function; cause a distributed computing system to execute the first group of functions in parallel, wherein execution of the first function generates a first result; determine, based on the first result, that a third function of the plurality of functions is ready to execute; and, cause the distributed computing system to execute the third function. The one or more hardware computing devices may be further configured to execute specific computer-executable instructions that upon execution cause the one or more hardware computing devices to: determine that the target is unavailable at a time that the third function is ready to execute; wait to cause the third function to be executed until the target becomes available; and cause, subsequent to the target becoming available, the third function to be executed by the distributed computing system.

Execution of the second function may generate a second result, and the one or more hardware computing devices may further execute specific computer-executable instructions that cause the one or more hardware computing devices to determine that a fourth function of the plurality of functions cannot be executed as part of the network scan based on the second result and, in response to determining that the fourth function cannot be executed as part of the network scan, inhibit the fourth function from being executed in connection with performing the network scan. The third function may be dependent on the first function based on the presence of a first condition that must be satisfied before the third function is ready to execute; the one or more hardware computing devices may be further configured to execute specific computer-executable instructions that upon execution cause the one or more hardware computing devices to determine that the first condition has been satisfied based on the first result.

Each function of the plurality of functions may be represented by a node of a plurality of nodes in a directed acyclic graph with a one to one correspondence between the plurality of functions and the plurality of nodes, and an edge pointing from a first node representing the first function to a third node representing the third function represents the first condition that must be satisfied before the third function is ready to execute. The one or more hardware computing devices may be further configured to execute specific computer-executable instructions that upon execution cause the one or more hardware computing devices to determine that the first function and the second function have no edges pointing toward them in the directed acyclic graph, and that the first function and the second function are ready to execute based on the absence of incoming edges to the first node and the second node. The one or more hardware computing devices may be further configured to execute specific computer-executable instructions that upon execution cause the one or more hardware computing devices to identify a first group of nodes of the plurality of nodes without incoming edges, and select the first group of functions based on nodes in the first group of nodes. Execution of the second function may generate a second result, and the one or more hardware computing devices may be further configured to execute specific computer-executable instructions that upon execution cause the one or more hardware computing devices to determine, based on the second result, that a fourth function of the plurality of functions is not required to execute to complete the network scan, remove a fourth node representing the fourth function from the directed acyclic graph, and remove at least one node of the plurality of nodes connected to the fourth function by an outgoing edge of the fourth node from the directed acyclic graph. The one or more hardware computing devices may be further configured to execute specific computer-executable instructions that upon execution cause the one or more hardware computing devices to remove the first node and one or more outgoing edges of the first node from the directed acyclic graph after the first function has been executed, and remove a second node corresponding to the second function and one or more outgoing edges of the second node from the directed acyclic graph after the second function has been executed.

In another aspect, the present disclosure provides a method that includes the steps of: selecting, from a plurality of functions related to performing a network scan of a target, a first group of functions that are ready to execute at a first time, including a first function and a second function; causing a distributed computing system to execute the first group of functions in parallel, wherein execution of the first function causes information to be sent to the target and generates a first result, and execution of the second function generates a second result; determining that a third function of the plurality of functions is ready to execute based on the first result, wherein the third function was not ready to execute at the first time; determining that a fourth function of the plurality of functions cannot be executed as part of the network scan based on the second result; and, in response to determining that the fourth function cannot be executed as part of the network scan, inhibiting the fourth function from being executed in connection with performing the network scan. The method may further include the steps of: determining that the target is unavailable at a time when the third function is ready to execute; in response to determining that the target is unavailable, waiting to cause the third function to be executed until the target becomes available; and causing, subsequent to the target becoming available, the third function to be executed by the distributed computing system.

The third function may be dependent on the first function based on the presence of a first condition that must be satisfied before the third function is ready to execute; determining that the third function of the plurality of functions is ready to execute may therefore include determining that the first condition has been satisfied based on the first result. Each function of the plurality of functions may be represented by a node of a plurality of nodes in a directed acyclic graph with a one to one correspondence between the plurality of functions and the plurality of nodes, and an edge pointing from a first node representing the first function to a third node representing the third function represents the first condition that must be satisfied before the third function is ready to execute; the first function and the second function have no edges pointing toward them in the directed acyclic graph at the first time, and selecting the first group of functions includes the step of determining that the first function and the second function are ready to execute based on the absence of incoming edges.

The method may further include the step of identifying a first group of nodes of the plurality of nodes without incoming edges; selecting the first group of functions may include the step of selecting the first group of functions based on nodes in the first group of nodes. The method may further include the steps of removing a fourth node representing the fourth function from the directed acyclic graph, and removing at least one node of the plurality of nodes connected to the fourth function by an outgoing edge of the fourth node from the directed acyclic graph.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
   an electronic data store configured to store a plurality of results received during a network scan;
   and a network scanning system in communication with the electronic data store and comprising one or more hardware computing devices configured to execute specific computer-executable instructions that upon execution cause the network scanning system to:
   receive information identifying a plurality of functions each implementing a corresponding test of a plurality of tests, the plurality of tests including:
   a first function corresponding to a first test of the plurality of tests;
   a second function corresponding to a second test of the plurality of tests, the second test identifying a first condition and a first result, of the first test, that satisfies the first condition;
   a third function corresponding to a third test of the plurality of tests; and
   a plurality of dependent functions that require execution of the third function in order to be ready for execution, wherein to be ready for execution, the third function requires a second condition to be satisfied, the second condition being dependent upon the first result;
   select, from the plurality of functions, a first group of functions that are ready to execute, the first group of functions including the first function;
   cause a network accessible services system to execute the first group of functions in parallel to perform a first portion of the network scan on a first target, the first result being produced by executing the first function and being stored in the electronic data store;
   obtain the first result; determine that the first result satisfies the first condition;
   determine, based on the first result satisfying the first condition, that the second function is ready to execute;
   select, from the plurality of functions subsequent to execution of the first group of functions, a second group of functions that are ready to execute, the second group of functions including the second function;
   cause the network accessible services system to execute the second group of functions in parallel;
   determine that the first result does not satisfy the second condition; and
   determine that the third function and the plurality of dependent functions are not required to be executed to complete the network scan for the first target.

2. The system of claim 1, wherein the one or more hardware computing devices are further configured to execute specific computer-executable instructions that upon execution cause the network scanning system to:
   determine, prior to execution of the first function, that the first result is related to the first condition;
   create a first dependency relationship between the first function and the second function;
   determine, prior to execution of the second function, that the second test produces a second result related to a second condition; and
   create a second dependency relationship between the second function and a fourth function corresponding to a fourth test of the plurality of tests, the fourth test identifying the second condition, wherein the second dependency relationship indicates that the fourth function depends on the second function; and
   generate a directed acyclic graph comprising:
   a first node associated with the first function, a second node associated with the second function, and a third node associated with the fourth function; and
   a first edge pointing from the first node toward the second node and a second edge pointing from the second node toward the third node.

3. The system of claim 2, wherein the one or more hardware computing devices are further configured to execute specific computer-executable instructions that upon execution cause the network scanning system to:
   select the first group of functions by selecting a first group of nodes from the directed acyclic graph that have no edges pointing toward them;
   subsequent to the first group of functions being executed, remove from the directed acyclic graph a second group of nodes corresponding to functions that have been executed and a third group of nodes corresponding to functions for which a corresponding condition was not satisfied; and
   select the second group of functions by selecting a fourth group of nodes from the acyclic graph that have no edges pointing toward them.

4. The system of claim 2, wherein the one or more hardware computing devices are further configured to execute specific computer-executable instructions that upon execution cause the network scanning system to:
- determine, based on the second result, that a fifth function of the plurality of functions is not required to execute to complete the network scan;
- remove a fifth node representing the fifth function from the directed acyclic graph; and
- remove at least one node of the plurality of nodes connected to the fifth function by an outgoing edge of the fifth node from the directed acyclic graph.

5. The system of claim 1, wherein the one or more hardware computing devices are further configured to execute specific computer-executable instructions that upon execution cause the network scanning system to, subsequent to causing the network accessible services system to execute the second group of functions:
- determine that a fourth function in the second group of functions did not execute to completion;
- select a third group of functions that are ready to execute, the third group of functions including the fourth function; and
- cause the network accessible services system to execute the third group of functions.

6. A system, comprising one or more hardware computing devices configured to execute specific computer-executable instructions that upon execution cause the one or more hardware computing devices to:
- select, from a plurality of functions implementing a network scan of a target, a first group of functions that are ready to execute, the first group of functions including a first function and a second function;
- cause a distributed computing system to execute the first group of functions in parallel, wherein execution of the first function generates a first result, and execution of the second function generates a second result;
- determine, based on the first result, that a third function of the plurality of functions is ready to execute;
- cause the distributed computing system to execute the third function;
- determine that a fourth function of the plurality of functions cannot be executed as part of the network scan based on the second result; and
- in response to determining that the fourth function cannot be executed as part of the network scan, inhibit the fourth function from being executed in connection with performing the network scan.

7. The system of claim 6, wherein the one or more hardware computing devices are further configured to execute specific computer-executable instructions that upon execution cause the one or more hardware computing devices to:
- determine that the target is unavailable at a time that the third function is ready to execute;
- wait to cause the third function to be executed until the target becomes available; and
- cause, subsequent to the target becoming available, the third function to be executed by the distributed computing system.

8. The system of claim 6, wherein the third function is dependent on the first function based on the presence of a first condition that must be satisfied before the third function is ready to execute, and wherein the one or more hardware computing devices are further configured to execute specific computer-executable instructions that upon execution cause the one or more hardware computing devices to determine that the first condition has been satisfied based on the first result.

9. The system of claim 8, wherein each function of the plurality of functions is represented by a node of a plurality of nodes in a directed acyclic graph with a one to one correspondence between the plurality of functions and the plurality of nodes, and an edge pointing from a first node representing the first function to a third node representing the third function represents the first condition that must be satisfied before the third function is ready to execute.

10. The system of claim 9, wherein the one or more hardware computing devices are further configured to execute specific computer-executable instructions that upon execution cause the one or more hardware computing devices to determine that the first function and the second function have no edges pointing toward them in the directed acyclic graph, and that the first function and the second function are ready to execute based on the absence of incoming edges to the first node and the second node.

11. The system of claim 9, wherein the one or more hardware computing devices are further configured to execute specific computer-executable instructions that upon execution cause the one or more hardware computing devices to:
- identify a first group of nodes of the plurality of nodes without incoming edges; and
- select the first group of functions based on nodes in the first group of nodes.

12. The system of claim 9, wherein the one or more hardware computing devices are further configured to execute specific computer-executable instructions that upon execution cause the one or more hardware computing devices to:
- determine, based on the second result, that a fifth function of the plurality of functions is not required to execute to complete the network scan;
- remove a fifth node representing the fifth function from the directed acyclic graph; and
- remove at least one node of the plurality of nodes connected to the fifth function by an outgoing edge of the fifth node from the directed acyclic graph.

13. The system of claim 9, wherein the one or more hardware computing devices are further configured to execute specific computer-executable instructions that upon execution cause the one or more hardware computing devices to:
- remove the first node and one or more outgoing edges of the first node from the directed acyclic graph after the first function has been executed; and
- remove a second node corresponding to the second function and one or more outgoing edges of the second node from the directed acyclic graph after the second function has been executed.

14. A method, comprising:
- selecting, from a plurality of functions related to performing a network scan of a target, a first group of functions that are ready to execute at a first time, including a first function and a second function;
- causing a distributed computing system to execute the first group of functions in parallel, wherein execution of the first function causes information to be sent to the target and generates a first result, and execution of the second function generates a second result;
- determining that a third function of the plurality of functions is ready to execute based on the first result, wherein the third function was not ready to execute at the first time;
- determining that the target is unavailable at a time when the third function is ready to execute;

in response to determining that the target is unavailable, waiting to cause the third function to be executed until the target becomes available;

causing, subsequent to the target becoming available, the third function to be executed by the distributed computing system;

determining that a fourth function of the plurality of functions cannot be executed as part of the network scan based on the second result;

in response to determining that the fourth function cannot be executed as part of the network scan, inhibiting the fourth function from being executed in connection with performing the network scan.

15. The method of claim 14, wherein the third function is dependent on the first function based on the presence of a first condition that must be satisfied before the third function is ready to execute, and determining that the third function of the plurality of functions is ready to execute further comprises determining that the first condition has been satisfied based on the first result.

16. The method of claim 15, wherein:
each function of the plurality of functions is represented by a node of a plurality of nodes in a directed acyclic graph with a one to one correspondence between the plurality of functions and the plurality of nodes, and an edge pointing from a first node representing the first function to a third node representing the third function represents the first condition that must be satisfied before the third function is ready to execute;

the first function and the second function have no edges pointing toward them in the directed acyclic graph at the first time, and selecting the first group of functions further comprises determining that the first function and the second function are ready to execute based on the absence of incoming edges.

17. The method of claim 16, wherein the method further comprises identifying a first group of nodes of the plurality of nodes without incoming edges, and selecting the first group of functions further comprises selecting the first group of functions based on nodes in the first group of nodes.

18. The method of claim 16, further comprising:
removing a fourth node representing the fourth function from the directed acyclic graph, and removing at least one node of the plurality of nodes connected to the fourth function by an outgoing edge of the fourth node from the directed acyclic graph.

19. The method of claim 16, further comprising:
determining, based on the second result, that a fifth function of the plurality of functions is not required to execute to complete the network scan;

removing a fifth node representing the fifth function from the directed acyclic graph; and removing at least one node of the plurality of nodes connected to the fifth function by an outgoing edge of the fifth node from the directed acyclic graph.

20. The method of claim 16, further comprising:
removing the first node and one or more outgoing edges of the first node from the directed acyclic graph after the first function has been executed; and removing a second node corresponding to the second function and one or more outgoing edges of the second node from the directed acyclic graph after the second function has been executed.

* * * * *